United States Patent
Kuboki et al.

(10) Patent No.: US 6,345,839 B1
(45) Date of Patent: Feb. 12, 2002

(54) SEAT FITTED WITH SEATING SENSOR, SEATING DETECTOR AND AIR BAG DEVICE

(75) Inventors: Naobumi Kuboki, Yokohama; Kenji Kondo, Kumagaya; Masato Miyahara, Isehara; Hirokazu Takewaki, Kawasaki; Yasuhiro Arima, Yokohama; Takuya Nishimoto, Chigasaki, all of (JP)

(73) Assignee: Furukawa Electronics Co., Ltd., Tokyo (JP)

( * ) Notice: Subject to any disclaimer, the term of this patent is extended or adjusted under 35 U.S.C. 154(b) by 0 days.

(21) Appl. No.: 09/142,694

(22) PCT Filed: Jan. 13, 1998

(86) PCT No.: PCT/JP98/00081

§ 371 Date: Apr. 8, 1999

§ 102(e) Date: Apr. 8, 1999

(87) PCT Pub. No.: WO98/30413

PCT Pub. Date: Jul. 16, 1998

(30) Foreign Application Priority Data

| Jan. 13, 1997 | (JP) | 9-003430 |
| Mar. 3, 1997 | (JP) | 9-047691 |
| Mar. 7, 1997 | (JP) | 9-053048 |
| Apr. 17, 1997 | (JP) | 9-099498 |
| May 21, 1997 | (JP) | 9-130858 |
| Oct. 14, 1997 | (JP) | 9-279269 |

(51) Int. Cl.⁷ .......................................... B60R 21/32
(52) U.S. Cl. ............. 280/735; 73/86.046; 73/862.632; 73/862.637

(58) Field of Search .................. 280/734, 735; 73/862.046, 862.042, 862.195, 862.632, 862.637

(56) References Cited

U.S. PATENT DOCUMENTS

| 5,573,269 A | * | 11/1996 | Gentry et al. | 280/734 |
| 5,612,876 A | * | 3/1997 | Zeidler et al. | 280/735 |
| 5,739,757 A | * | 4/1998 | Gioutsos | 280/735 |
| 5,878,620 A | * | 3/1999 | Gilbert et al. | 280/735 |
| 5,890,085 A | * | 3/1999 | Corrado et al. | 280/735 |

FOREIGN PATENT DOCUMENTS

| JP | 1-160747 | 6/1989 |
| JP | 2-38164 | 2/1990 |
| JP | 5-139233 | 6/1993 |
| JP | 7-186879 | 7/1995 |
| JP | 7-186880 | 7/1995 |
| JP | 7-196006 | 8/1995 |
| JP | 7-285364 | 10/1995 |
| JP | 2519546 | 9/1996 |

* cited by examiner

Primary Examiner—Eric Culbreth
(74) Attorney, Agent, or Firm—Jacobson Holman, PLLC

(57) ABSTRACT

A seating sensor is provided on a seat back part and/or a seat cushion part of a seat in use for a vehicle such as an automobile, and calculates physical conditions, such as a height and weight of an occupant, to judge whether the subject on the seat is a human or an object. On the basis of the results of such calculation and judgement, the operation of an air bag is controlled. The seating sensor includes a sensing element which is variable in its electric resistance in response to the pressure variation, and the pressing force is detected on the basis of the variation of the electric resistance value.

25 Claims, 24 Drawing Sheets

SEAT FITTED WITH SEATING SENSOR, SEATING DETECTOR AND AIR BAG DEVICE

TECHNICAL FIELD

This invention relates to a seat with a seating sensor, a seating detection device and an air bag apparatus in use for a vehicle such as an automobile.

BACKGROUND ART

In recent years, an air bag apparatus tends to be installed on the vehicle such as an automobile in order to protect a vehicle occupant in a crash condition. Such an air bag is normally contained within a steering wheel assembly or an instrument panel, and a squib or an inflator is ignited so as to inflate the air bag in a form of a balloon as the vehicle crash condition is sensed, whereby the occupant on the seat is protected from being forcefully and forwardly moved or inclined.

The air bag apparatus is also provided in the passenger's side or assistant driver's side as well as the driver's side, and the passenger's side air bag apparatus is adapted to be ignited and inflated at the same time of ignition and inflation of the driver's side air bag apparatus, as the vehicle crash condition is detected. However, an occupant is not always seated on the passenger's seat, and therefore, the passenger's side air bag can be inflated regardless of presence or absence of an occupant, which may result in need of expense involved in somewhat meaningless repair works of the instrument panel.

In Japanese Utility-Model Publication No. 2519546, technical arrangement is proposed, which can detect presence or absence of an occupant with use of an ultrasonic distance-measuring device installed on an instrument panel. Further, another technical arrangement is proposed in Japanese Patent Laid-Open Publication No.1-160747, in which a sensing switch for detecting presence or absence of an occupant is installed inside a seat. Those arrangements might enable the air bag to be controlled in operation so that the passenger's side air bag is not inflated when no occupant is seated on the passenger's seat.

Although the conventional art of this technical field is capable of distinguishing presence or absence of a human or an object on the seat, it has the following defects;

(1) Recently, one type of accident raised a problem, in which a child or a physically small female person on a passenger's seat was pressed by an inflated air bag. Occurrence of such an accident is considered to be resulted from inflation of the air bag which may be effected regardless of the physical condition of the occupant on the passenger's seat. The prior art, however, cannot overcome the problem because the conventional arrangement is not so functioned that physical conditions of an occupant including height, weight and the like can be detected and that determination can be made so as to distinguish a child from adults.

(2) In the prior art, a determination cannot be made as to what is seated on the seat, i.e., whether a human is seated or whether an object is seated. Therefore, the air bag is normally operated in spite of an object being placed on the seat, which results in a somewhat wasteful expense involved in a replacement of the air bag, a repair work of the instrument panel, or a damage of the object due to the pressure of the air bag.

(3) In high-class cars, an automatic adjustment device may be installed, which includes a readable memory to be instructed with switching manipulation to output a preferable seat position, inclination of a seat back, position of a steering wheel and the like as desired by the occupant, thereby automatically regulating those devices or constituents to be desirable positions or angles. The prior art, however, is not capable of individually recognizing the occupant, and therefore, a plurality of users of the vehicle each has to input data of desirable seat position, seat back inclination angle, steering wheel position and the like into the memory to be memorized therein respectively, and in use, each user has to manipulate a registered switch or input a registered I.D. number or the like. Such manipulations of the device are somehow troublesome.

SUMMARY OF INVENTION

It is an object of the present invention to provide a vehicle seat with a seating sensor which is capable of calculating physical conditions of a subject on the seat, such as a height and weight of an occupant, determining whether the occupant is an adult or a child, determining whether the subject on the seat is a human or an object and individually recognizing an identification of the occupant.

It is another object of the present invention to provide a seating detection device which is able to determine whether a subject seated on the seat is a human or an object and which is capable of recognizing the physical figures of the subject when it is a human.

It is still another object to provide an air bag apparatus which is able to control an operation of the air bag in accordance with the physical figures of the occupant if the subject on the seat is a human, and which is capable of limiting the operation of the air bag if the subject is an object.

According to the present invention, the seat with seating sensor comprises a seating sensor provided on a seat back part for detecting a value and position of a pressure transmitted from a back of an occupant leaning against the seat back, and means for calculating a height of the occupant on the basis of the value and position of the pressure detected by said seating sensor.

Further, the seat with seating sensor according to the present invention comprises a seating sensor provided on a seat cushion part for detecting a value and position of a pressure transmitted from a hip of an occupant seated on the seat cushion part, and means for calculating a weight of the occupant on the basis of the value and position of the pressure detected by said seating sensor.

Still further, the seat with seating sensor comprises a first seating sensor provided on a seat back part for detecting a value and position of a pressure transmitted from a back of an occupant leaning against the seat back, a second seating sensor provided on a seat cushion part for detecting a value and position of a pressure transmitted from a hip of the occupant seated on the seat cushion part, and means for calculating a weight of the occupant on the basis of the value and position of the pressure detected by said first and second seating sensors.

Preferably, the seat with seating sensor further comprises means for comparing a resultant value obtained by the calculation of said calculating means with a predetermined reference value.

From another aspect of the present invention, the seat with seating sensor comprises a seating sensor provided on the seat for detecting a pressure transmitted from an occupant on the seat, memory means for storing data of the pressure of the occupant detected by said seating sensor, and means for comparing the pressure data currently detected by said seating sensor with the data memorized in said memory means and specifying the data closest to each other.

From still another aspect of the present invention, the seat with seating sensor comprises a seat body, a pad contained in the seat body, and a seating sensor interposed between a surface material of said seat body and said pad, wherein the seating sensor has a plurality of pressure sensitive sections for sensing a value and position of the pressure transmitted from an occupant, and wherein a protrusion in contact with said pressure sensitive section is provided on an upper surface of said pad.

Preferably, the above seating sensor includes a sensing element which is variable in electric resistance in response to the pressure.

It is preferable that the above seating sensor is provided with a plurality of sensing elements arranged in a formation of two-dimensional matrix.

The seating detection device according to the present invention comprises a hip sensor provided on a bench part of a vehicle seat, a foot sensor provided on a vehicle floor forward of said bench part, and subject determination means for determining what a subject is seated on the seat, based on the pressure detected by said hip sensor and said foot sensor.

From another aspect of the present invention, the seating detection device according to the present invention comprises a pressure sensitive sensor which is provided at least on a seat cushion part and which detects a pressure of a seated subject, and subject determination means for determining what the subject is, based on a variation with time on the pressure detected by said pressure sensitive sensor.

The subject determination means may be so arranged to compare the detected pressure value with a predetermined reference value, thereby determining whether the subject is a human or whether it is an object.

Alternatively, the subject determination means may be so arranged to compare the detected pressure value with a predetermined reference value, thereby determining whether the =subject is a human having a weight no less than a predetermined weight, or whether it is a human having a weight less than the predetermined weight.

The subject determination means also may be so arranged to compare the detected pressure value with a predetermined reference value, thereby determining whether the subject is a human or an object, and further whether the human has a weight no less than a predetermined weight or less than the predetermined weight.

Preferably, the seating detection device according to the present invention further comprises a sensing element which is variable in electric resistance in response to the pressure variation.

It is preferable that the seating detection device is provided with a plurality of sensing elements arranged in a formation of two-dimensional matrix.

The seating detection device of the present invention may include a sensor for detecting a temperature of the seated subject.

In the air bag apparatus according to the present invention, operation of the air bag is controlled on the basis of the results detected by said seating sensor provided in said seat.

Alternatively, the air bag apparatus of the present invention is controlled in its operation for the air bag on the basis of the results detected by said seating detection device.

From another aspect of the present invention, the air bag apparatus comprises a pressure sensitive sensor provided in the bench part of the seat, figure determination means for measuring a pressure distribution on the bench part through the pressure sensitive sensor and determining a physical figure of the occupant on the basis of a distance between two pressure peak points presenting beneath a hip of the occupant, and control means for controlling the operation of the air bag in accordance with the results of determination of the figure determination means.

Preferably, the above pressure sensitive sensor may include a sensing element which is variable in its electric resistance in response to the pressure variation.

It is preferable that the pressure sensitive sensor may have a plurality of sensing elements arranged in a two-dimensional matrix formation.

BRIEF DESCRIPTION OF DRAWINGS

FIGS. 17a, 17b and 17c include diagrams, each illustrating a variation with time in a condition that an occupant is normally seated on the seat cushion part provided with the seating detection device of the fifth embodiment, wherein FIG. 17(a) shows a variation of loads imposed on an upper surface of the seat, FIG. 17(b) shows a variation on coordinates of the center of gravity, and FIG. 17(c) shows a variation on the number of the pressed sensors;

FIGS. 18a, 18b and 18c include diagrams, each illustrating a variation with time in a condition that a baggage is seated on the seat cushion part provided with the seating detection device of the fifth embodiment, wherein FIG. 18(a) shows a variation of loads imposed on the upper surface of the seat, FIG. 18(b) shows a variation on coordinates of the center of gravity, and FIG. 18(c) shows a variation on the number of the pressed sensors;

FIGS. 19a, 19b and 19c include diagrams, each illustrating a variation with time in a condition that an occupant is slowly seated on the seat cushion part provided with the seating detection device of the fifth embodiment, wherein FIG. 19(a) shows a variation of loads imposed on the upper surface of the seat, FIG. 19(b) shows a variation on coordinates of the center of gravity, and FIG. 18(c) shows a variation on the number of the pressed sensors;

DETAILED DESCRIPTION OF THE INVENTION

Preferred embodiments of the present invention will now be described in detail with reference to the attached drawings.

Figure 1:
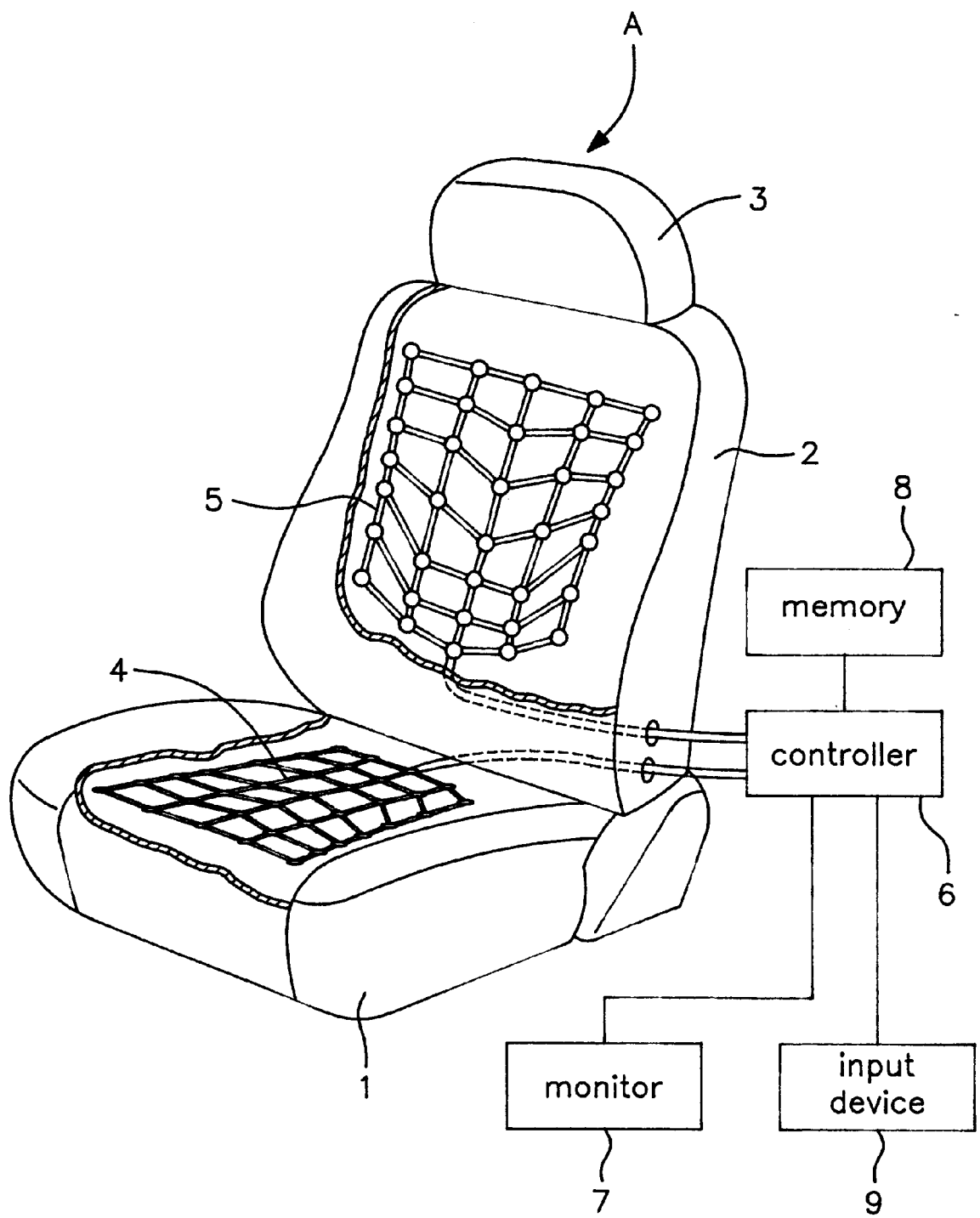
FIG. 1 is a partially sectional perspective view showing a vehicle seat with a seating sensor in first and second embodiments according to the present invention.

FIG. 1 is a partially sectional perspective view showing a vehicle seat with a seating sensor in a first embodiment according to the present invention. As shown in FIG. 1, the seat with a seating sensor A is used for a seat in a vehicle, such as an automobile vehicle. A vehicle seat includes a seat cushion part 1 and a seat back part 2 pivotally mounted on the seat cushion part 1. The seat back part 2 is provided at an upper portion thereof with a head rest part 3.

Surfaces of the seat cushion part 1 and the seat back part 2 are made of a cloth, vinyl or leather, and seating sensors 4,5 are provided beneath a thin sponge contained therein, respectively. The seating sensor 4 secured to the seat cushion part 1 is adapted to detect a value and position of the pressure applied by a hip of an occupant on the seat, whereas the seating sensor 5 secured to the seat back part 2 is adapted to detect a value and position of the pressure applied by a back of the occupant, whose back leans on the seat back part 2. As is mentioned below, the seating sensors 4,5 detect the pressure value and the pressed position on the basis of variations on the electric resistance with use of a material which can vary in its electric resistance in response to the pressure value. Each of the seating sensors 4,5 is electrically connected with a controller 6 for controlling various kinds of devices, such as an inflator of the air bag.

The controller 6 comprises a mathematically controllable micro-computer which measures data of the pressure values and the pressed positions sensed by the seating sensors 4,5 in a predetermined time period in order to calculate the occupant's height and weight through a digital treatment procedure, whereby the respective devices of the air bag, e.g., the inflator is controlled in its operation in accordance with the results thus calculated. The aforementioned predetermined time may be set to be, e.g., a period lasting for a few seconds after the occupant sits on the seat and fastens seat belts. In such a case, a switch for sensing a fastening motion of the seat belts is provided to initiate a measurement operation at the time of sensing the fastening motion. This measuring procedure is not repeatedly performed, even if the occupant changes the position in a long time following the above initial measuring action. That is, such a measuring operation of the seating sensors is adapted to be kept inoperative once operated, until the seat belts are unfastened and then, fastened again.

Further, the controller 6 is connected with a monitor 7 for visual display of the image-processed data of pressure valves and pressed positions detected by the seating sensors 4,5, a memory 8 for storing data of reference values and the like as to the height and weight of the occupant on the seat (including child seat, an animal and so forth), and an input device 9 for setting various kinds of data.

Figure 2:
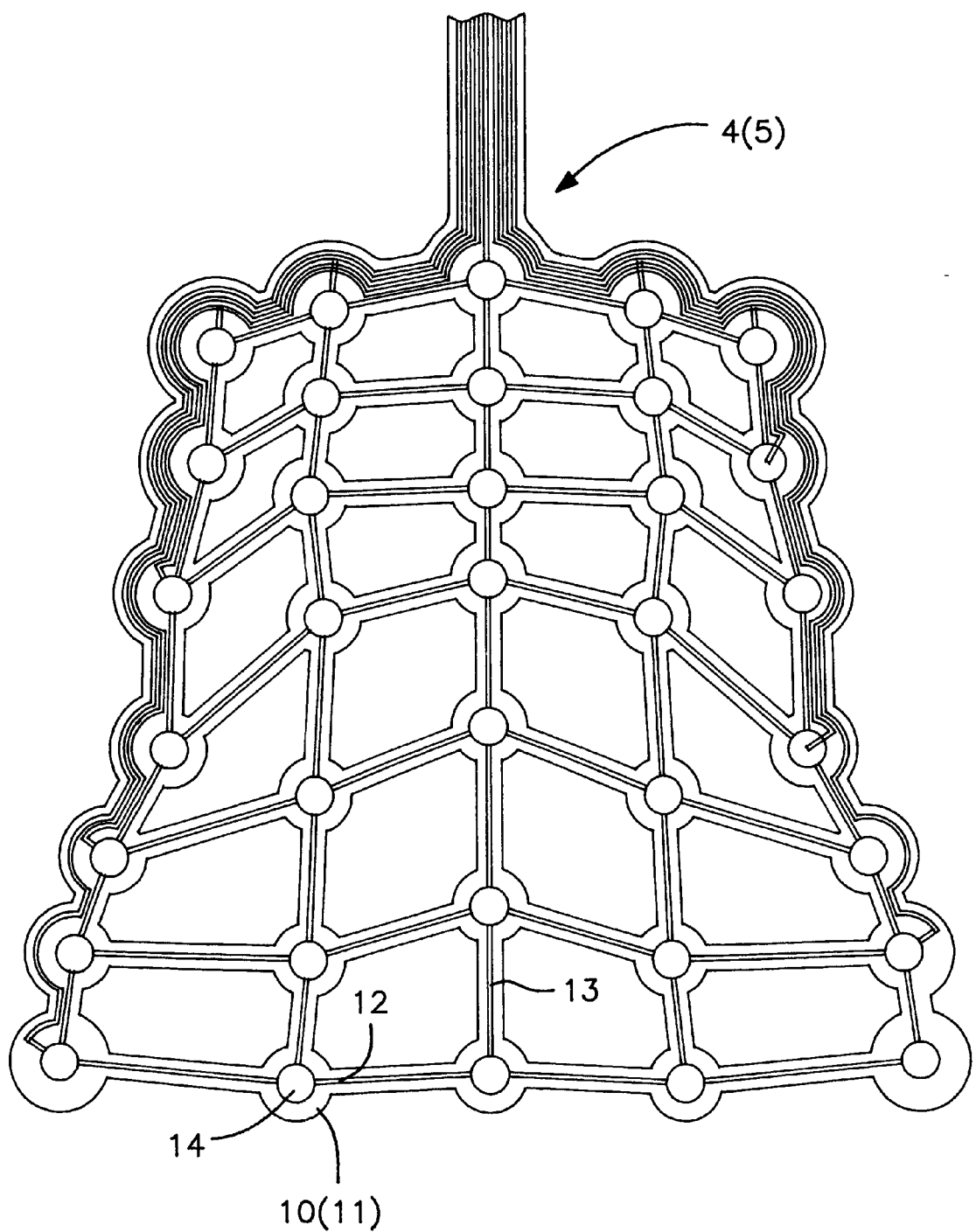
FIG. 2 is a plan view of the seating sensor.
Figure 3:
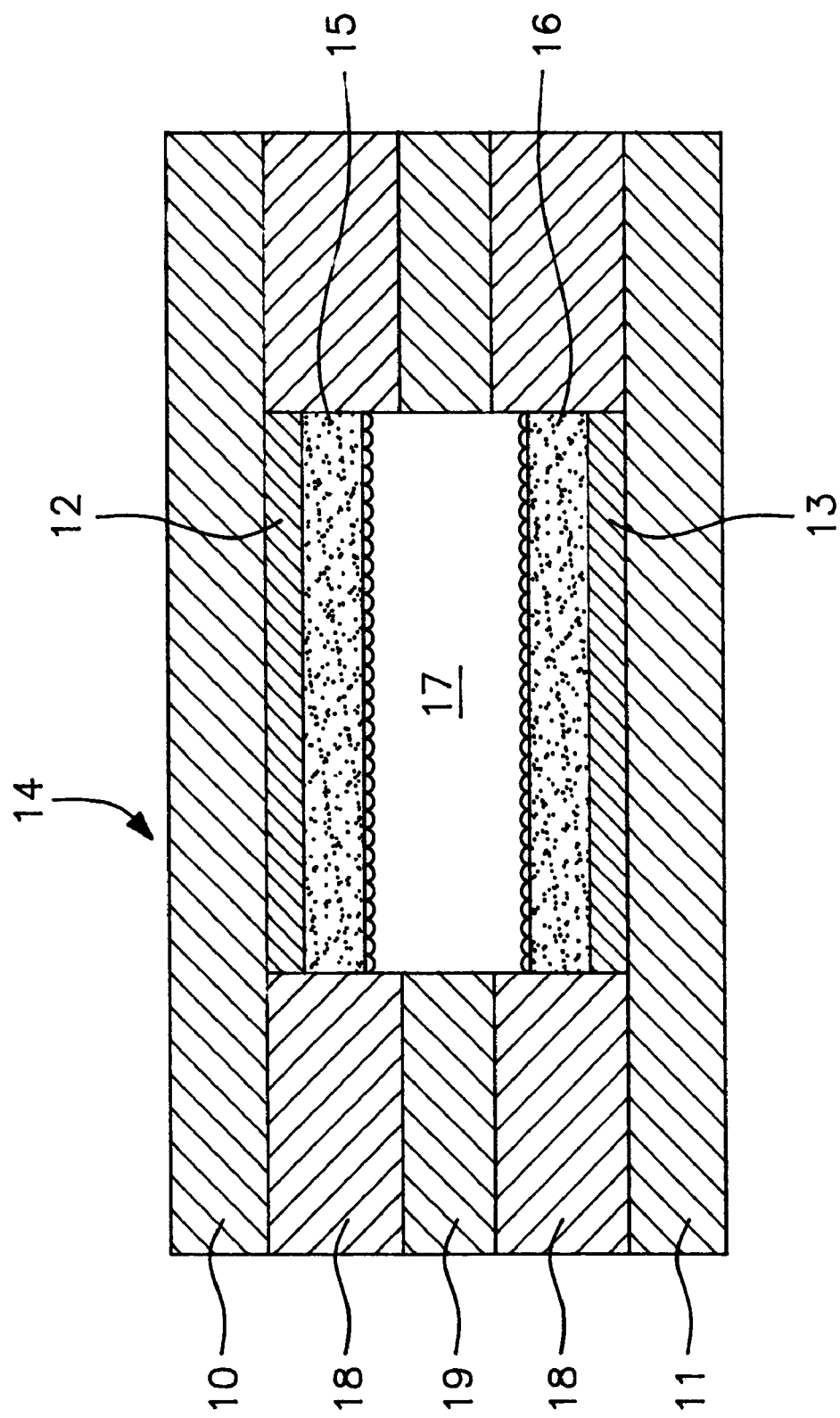
FIG. 3 is a cross-sectional view showing an internal construction of a pressure sensitive section of the seating sensor.

FIG. 2 is a plan view of the seating sensor and FIG. 3 is a cross-sectional view showing an internal construction of a pressure sensitive section of the seating sensor.

As shown in FIGS. 2 and 3, the seating sensors 4,5 are generally formed in a trapezoidal formation having dimensions of approximately 35 cm in length and 30 cm in width. The seating sensor 4,5 comprise transparent polyethyleneterephthalate (PET) films 10,11 extending in parallel on upper and lower sides thereof, seven electrodes 12 arranged in a direction of rows and printed on the upper PET film 10, five electrodes 13 arranged in a direction of lines and printed on the lower PET film 11, and thirty-five pressure sensitive sections 14 which are positioned at respective intersections of the electrodes 12,13 and which are arranged in a row of seven elements and in a line of five elements. In the present embodiment, the number of electrodes is set to be twelve. The total number of electrodes is preferably limited to be no greater than twenty, taking the electrode number of the joint connectors into consideration.

The row and line electrodes 12, 13 are formed by electric conductive ink containing metal powders such as silver powders or copper powders as major constituents, which is printed on the PET films by a known printing means.

As shown in FIG. 3, each of pressure sensitive sections 14 comprises a pressure sensitive ink 15 applied or printed on the row electrode 12 which is printed on the upper PET film 10, and a pressure sensitive ink 16 applied or printed on the line electrode 13 which is printed on the lower PET film 11. A substance is adopted as the pressure sensitive ink 15,16, which indicates a high electric resistance ( nonconductivity ) under a condition in that no pressure is imposed thereon, whereas the electric resistance varies in response to the increased pressure as it is pressurized, and which contains conductive particles or semi-conductive particles. Since the surfaces of the pressure sensitive ink 15,16 has irregularity, a cavity 17 of a constant distance is provided therebetween, so that mutual adhesion thereof is prevented from occurring.

The row and line electrodes 12,13 are covered at peripheral zones with insulation layers 18 for insulating the respective electrodes, and the insulation layers 18 are adhered to each other by means of a viscous material 19.

Figure 4A:
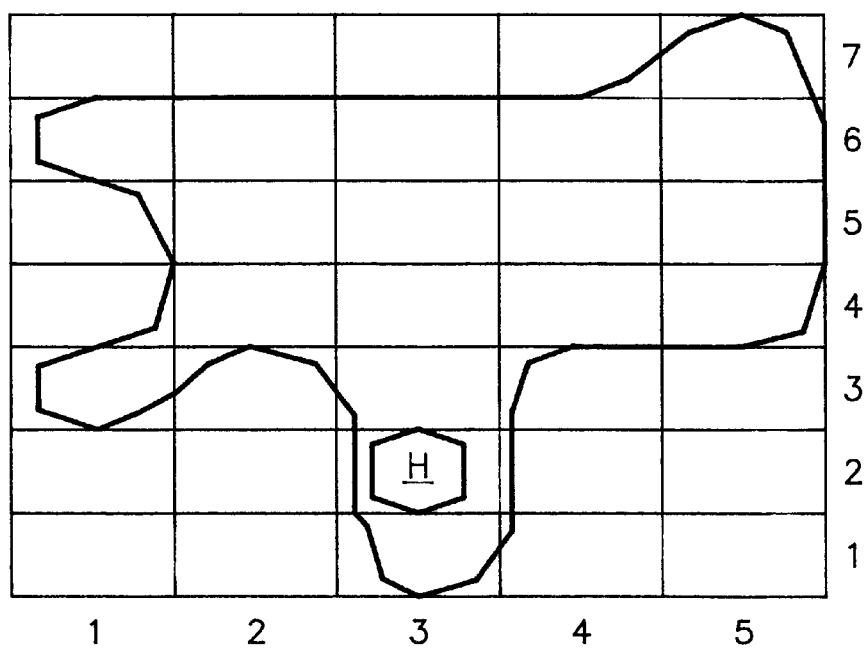
FIGS. 4A and 4B are graphic illustrations of visual representation which are displayed as a result of an image processing of values and positions of pressures, FIG. 4(A) showing an example of the image processing of values and positions of pressures detected by the seating sensor of a seat cushion part and FIG. 4(B) showing an example of the image processing of values and positions of pressures detected by the seating sensor of a seat back part.
Figure 4B:
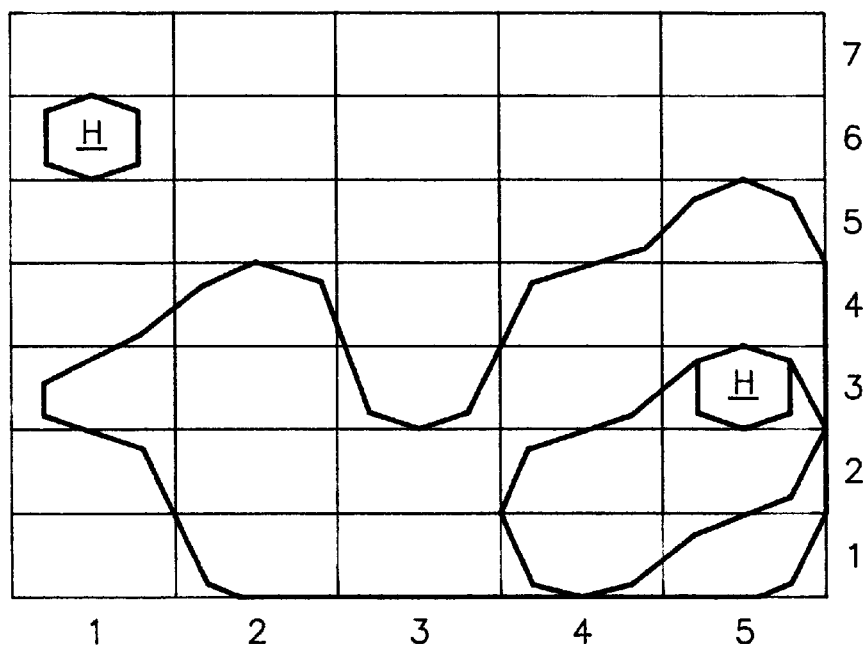

FIGS. 4A–C are a graphic illustration of a visual representation which is displayed as a result of an image processing of values and positions of pressures, FIG. 4(A) showing an example of the image processing of values and positions of pressures detected by the seating sensor 4 of a seat cushion part 1 and FIG. 4(B) showing an example of the image processing of values and positions of pressures detected by the seating sensor 5 of a seat back part 2. In FIG. 4, numerals shown on its lower and right sides are coordinate values for indicating the positions of the pressure sensitive sections 14 of the seating sensor 4 (5), wherein modules corresponding to the regions of the seating sensor 4(5) are presented in representations of hexagonal formations H. Further, colored indications are made in a form of contour line representation in accordance with pressure values.

A bar chart in which an abscissa and ordinate are defined by the height and weight may be displayed on the monitor 7.

According to the seat with the seating sensor A of the present invention, the pressure imposed by the occupant's hip and the pressed positions thereof are detected by the seating sensor 4 provided on the seat cushion part 1, and the pressures imposed by the occupant's back and the pressed positions thereof are detected by the seating sensor 5 on the seat back part 2.

According to the seat with seating sensor A of the present invention, the pressure imposed by the occupant's hip and the pressed positions thereof are detected by the seating sensor 4 provided on the seat cushion part 1, and the pressures imposed by the occupant's back and the pressed positions thereof are detected by the seating sensor 5 on the seat back part 2.

Then, the controller 6 calculates the height of the occupant in relation to the pressure values and pressed positions detected by the seating sensor 5 on the seat back part 2, and the weight of the occupant in relation to those detected by the seating sensor 4 on the seat cushion part 1.

As an alternative of the seat with seating sensor according to the present invention, the weight of the occupant may be calculated in relation to the pressure values and pressed positions detected by both of the seating sensors 4,5. In such a case, the weight of the occupant can be correctly calculated by taking the pressures on the seat back part 2 into consideration, even if the pressure on the seat cushion part 1 varies in response to the inclination angle of the seat back part 2 or a leaning manner of the occupant's back.

Thereafter, a determination is made with a comparison of the calculated results and predetermined reference values. For instance, reference values are preset as to the occupant's height and weight in order to distinguish a physically large person and a physically small person, and comparison of the calculated height and weight with the reference values is performed. If the calculated results indicate values greater than the reference values or equal thereto, it is determined that the occupant is a relatively big person. On the other hand, if the calculated results indicate values smaller than the reference values, it is determined that the occupant is a relatively small person. In a case where the occupant is determined to be physically big, the air bag apparatus is permitted to be normally operated. In a case where the occupant is determined to be physically small, the apparatus is adjusted or switched to restrict the inflation action of the air bag; otherwise, it is rendered inoperative, whereby an accident in which an infant or a small female person on a front passenger's seat is pressed by the inflated air bag can be avoided. Further, it is possible to inhibit the operation of the air bag for a seat on which no occupant is seated, when it is so determined.

Still further, the seat A with the seating sensor is able to effect recognition of an individual by calculating a height and/or weight of the occupant on the seat. For instance, the controller 6 may be connected to means for automatically adjusting the position of the seat, the inclination of the seat back, the position of a steering wheel or the like. If the seat position, the inclination of the seat back, the position of the steering wheel or the like are preset as desired, the positions, inclination or like can be automatically regulated to be desirable conditions. Thus, troublesome operations in a conventional device can be eliminated in which each of occupants has to operate switches or input a registered identification number, and therefore, such an arrangement is very convenient if a plurality of users use a single vehicle.

In addition, the controller 6 may be coupled to a locking means against stealing, so that an alarm is raised or an engine starting operation on the vehicle is prohibited when any occupant other than the specific persons is seated on the seat to start the engine.

The sizes and configurations of the seating sensor 4,5, or the number of the row electrodes 12, line electrodes 13, pressure sensitive sections 14 and the like are not limited to those illustrated on the attached drawings, and therefore, any variations thereon may be suitably employed. Further, the arrangement of the seat A with the seating sensor can be applied to a driver's seat or rear seats as well as the front passenger's seat. Further, the seating sensor 4,5 may be provided for either of the seat cushion part 1 and the seat back part 2.

The seat with the seating sensor of the second embodiment according to the present invention is now described in detail. The seat with the seating sensor of the second embodiment basically has an arrangement similar to those of the first embodiment. The seat with the seating sensor in the second embodiment, however, has features in that the data of the pressures given by the occupants and detected by the seating sensors 4,5 are stored in the memory 8 and that the controller 6 compares the data currently detected by the sensor 4,5 with the data kept in the memory 8 so as to specify the memorized data closest to the detected data.

Setting of the various data is performed in a setting mode of the memory 8 in which it is in a writable condition. In the setting mode, the occupant is seated, and data is inputted through an input device 9 into the memory 8 and memorized therein, the inputted data including e.g., a name, weight and sitting height of the occupant, or operating instructions to various devices.

The results of recognition of the controller 6, e.g., the name, weight, sitting height or operating conditions of the respective devices, which are the closest data among the data stored in the memory 8, may be displayed on the monitor 7, although they are not shown in the attached drawings.

For example, according to the seat with seating sensor of the second embodiment of the present invention, the pressure values of the hip and back of any occupant "X" pressing against the seat are sensed by the seating sensors 4,5 provided in the seat, when the individual "X" is seated on the vehicle seat, and the detected data can be inputted and stored in the memory 8. These successive procedures from sensing to memorizing can be automatically accomplished. However, it is preferable that the information of the data to be memorized in the memory 8 is given to the occupant immediately before the input of the data into the memory 8 so that the occupant can confirm the data to be memorized and select its necessity of memorizing. Upon this procedure, data relating to the individual "X" (individual name, instructions to the other devices, sitting height and the like) are inputted through the input device 9. Such being the case, the data of the occupants (family members of the owner of the vehicle or the like) or objects to be frequently seated or placed on the seat are preliminarily stored in the memory 8.

Once the data are stored in the memory 8 in such a manner, pressures are measured by the seating sensors 4,5 every time when the occupant is seated, and the controller 6 compares the currently measured data of the pressures with the pressure data stored in the memory 8 to extract the closest data therein. For instance, if the difference between the detected data and the memorized data does not exceed a range of predetermined values, it is recognized that the detected data fall under the data stored in the memory 8 and that the detected data are of individual "X". On the other hand, if the above difference exceeds the predetermined value range, it is recognized that the detected data do not fall under any data stored in the memory, and following successive processes can be selectively performed. Such a determination of individual person or object allows various devices including the air bag apparatus to be controlled, based on the results of recognition.

Information indicating absence of an occupant, a child seat or an animal can be memorized in the memory 8 in a similar fashion. When the absence of an occupant or the like is recognized, the air bag apparatus can be rendered to be inoperative.

Figure 5:
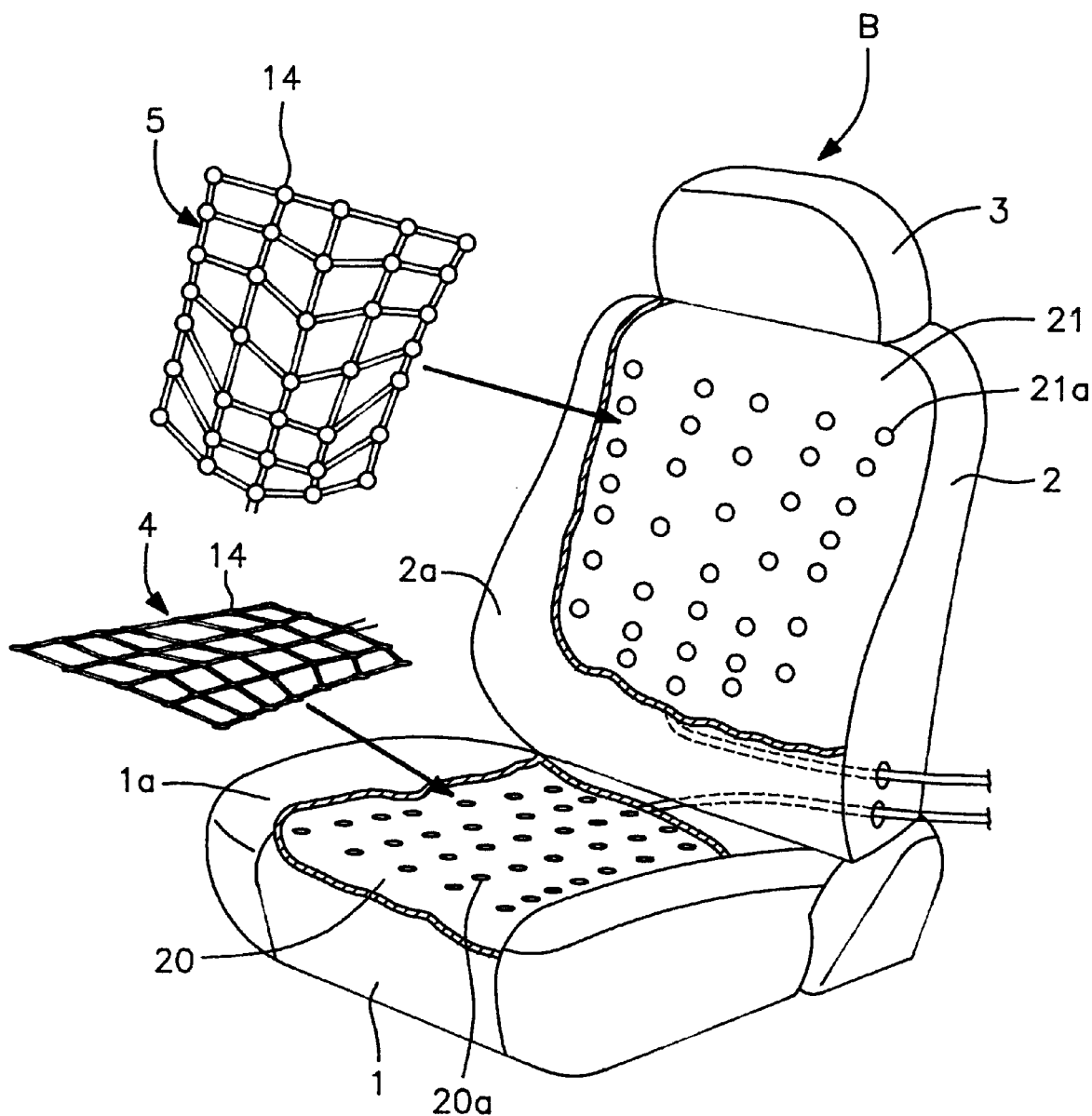
FIG. 5 is a partially sectional perspective view of the seat with a seating sensor in a third embodiment according to the present invention, which is illustrated in a disassembled state.

A third embodiment of the seat with sensing sensor according to the present invention is described hereinafter. FIG. 5 is a partially sectional perspective view of the seat with seating sensor in the third embodiment according to the present invention, and FIG. 6 is a vertical sectional view of the seat with seating sensor therein.

Figure 6:
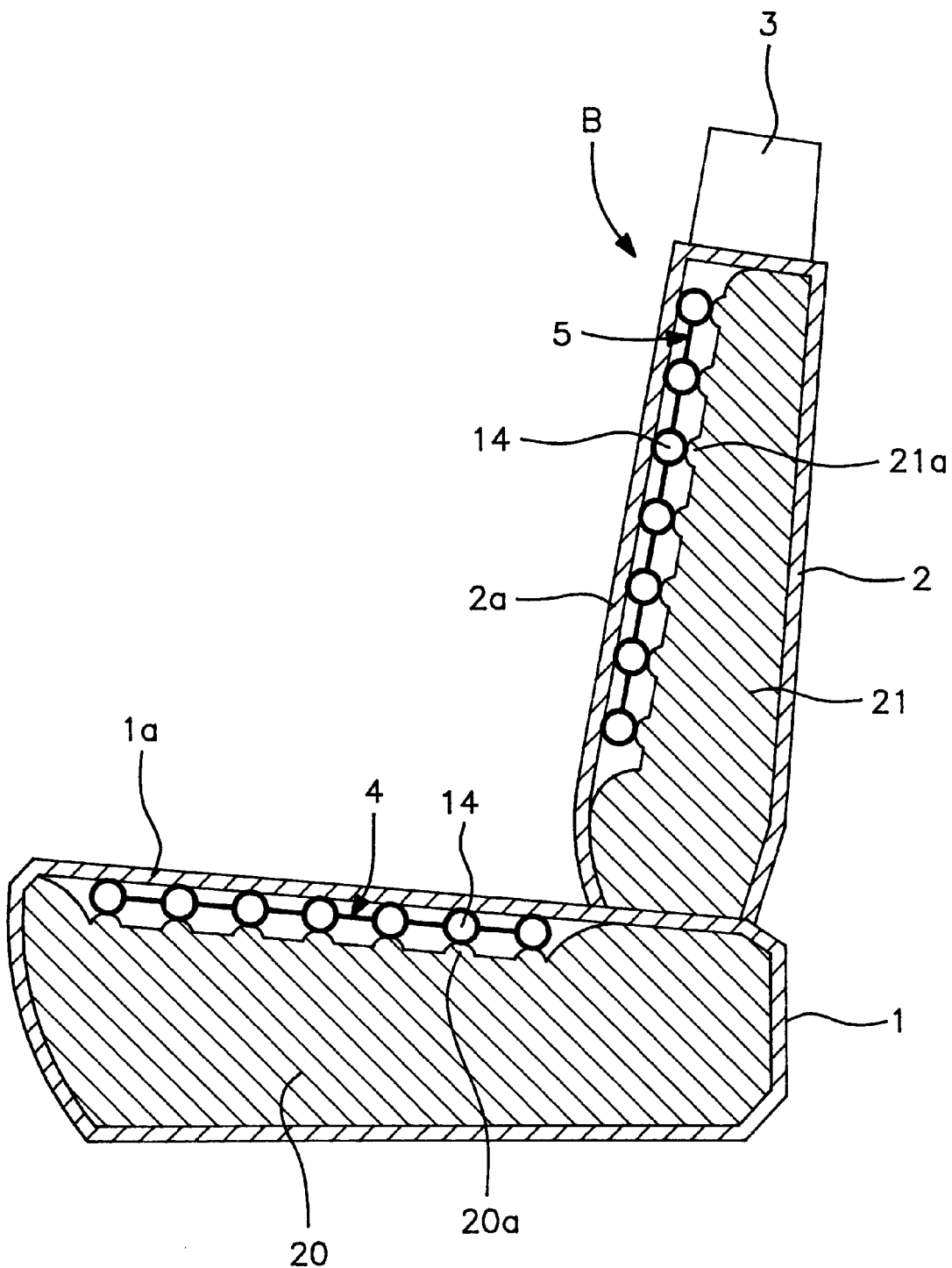
FIG. 6 is a vertical sectional view of the seat with a seating sensor in the third embodiment according to the present invention.

As shown in FIGS. 5 and 6, surface portions 1a, 2a of the seat cushion part 1 and the seat back part 2 are made of fabric or cloth in the third embodiment of the seat with seating sensor according to the present invention. Pads 20, 21 for shaping the general profile are contained in the seat cushion part 1 and the seat back part 2. The seating sensor 4 is interposed between the surface portion 1a and the pad 20 of the seat cushion part 1, and the seating sensor 5 is interposed between the surface 2a and the pad 21 of the seat back 2.

Each of the pads 20, 21 is provided with protrusions 20a, 21a in positions corresponding to the respective pressure sensitive sections 14 of the seating sensors 4,5. The protrusions 20a, 21a are configured in a form of semi-sphere or semi-cylindrical form, which has a height to the extent that the occupant on the seat does not feel an uncomfortable impression therefrom. The protrusions 20a, 21a may be integrally formed on the pads 20, 21 or made from elastic materials adhered to the pads 20, 21.

According to the third embodiment of the seat with seating sensor, the protrusions 20a, 21a in contact with the pressure sensitive sections 14 of the sensors 4,5 are provided on the surfaces of the pads 20, 21 so that the pressing force transmitted to the pressure sensitive section 14 upon pressed is enhanced, and therefore, the pressure transmitted from the occupant is surely sensed even if the pressure is weak. Thus, the height and weight of the occupant can be correctly detected without increasing the number of the pressure sensitive sections 14.

Figure 7:
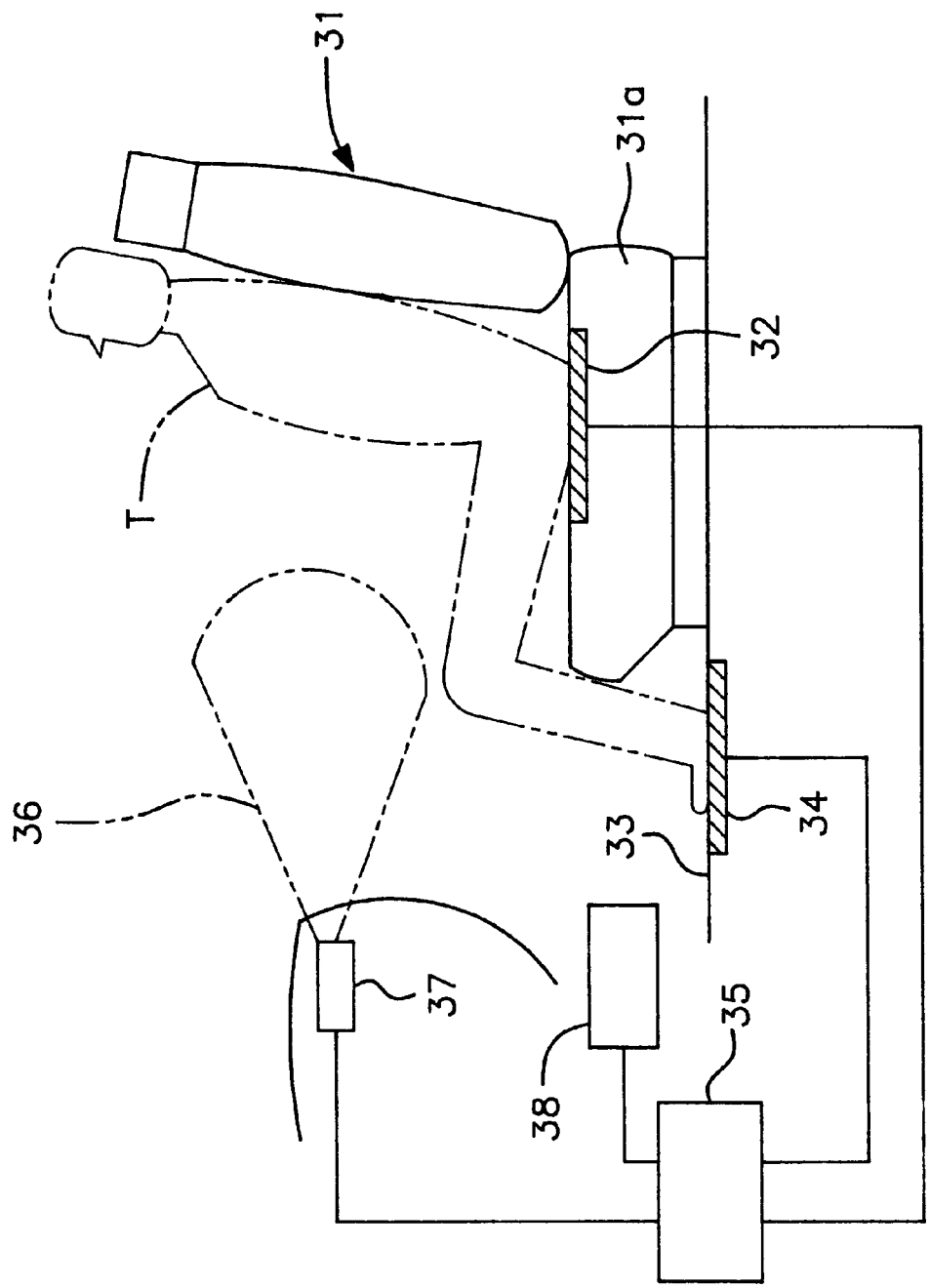
FIG. 7 is a side elevational view showing an arrangement of a seating detection device in a fourth embodiment according to the present invention.

A seating detection device of a fourth embodiment according to the present invention is described with reference to FIG. 7, which is a side elevational view of the seating detection device of the fourth embodiment. As shown in FIG. 7, the seating detection device according to the present invention comprises a hip sensor 32 attached to the bench part 31a of a vehicle seat 31, a foot sensor 34 located on a floor portion 33 forward of the seat 31, and subject determination means 35 for recognizing the subject T on the basis of the pressure detected by the hip sensor 32 and the foot sensor 34.

The hip sensor 32 is interposed between a surface portion of the bench part 31a and a pad (not shown) contained in the bench part 31a, and the foot sensor 34 is positioned beneath a carpet placed on the floor 33.

The subject determination means 35 is adapted to compare the pressure values detected by the hip sensor 32 and the foot sensor 34 with a predetermined reference values in order to determine whether the seated subject T is a human or an object, whether the subject T is a person of a weight greater than or equal to a predetermined weight, and whether the subject T is a person of a weight less than the predetermined weight. The subject determination means 35 is connected with, e.g., an inflator 37 of an air bag 36 so as to control an operation of the inflator 37 in accordance with the results of recognition. The subject determination means 35 is also connected with a memory 38 for memorizing data, which include reference values on the basis of which the determination is performed.

Figure 8:
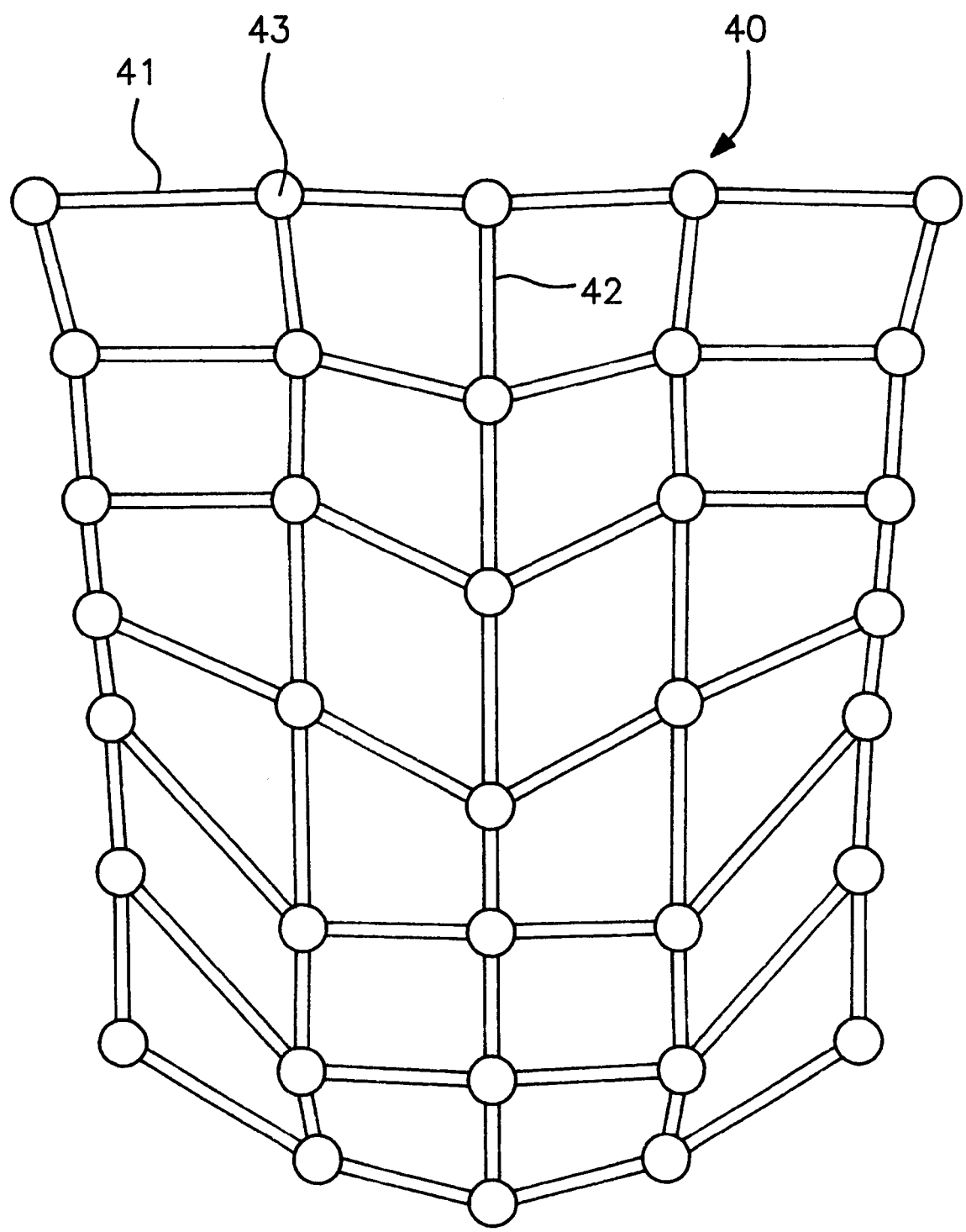
FIG. 8 is a plan view of a pressure sensitive sensor which can be used as a hip sensor and a foot sensor.

FIG. 8 is a plan view showing the pressure sensitive sensor used as the hip sensor 32 and the foot sensor 34. As illustrated on FIG. 8, this pressure sensitive sensor 40 comprises transversely extending row electrodes 41, longitudinally extending line electrodes 42, and pressure sensitive sections 43 located at intersections of the row and line electrodes 41, 42. The row and line electrodes 41, 42 are printed on transparent PET films or the like, respectively.

The pressure sensitive section 43 is made of a material which is variable in its electric resistance in response to the applied pressure value, so that the pressure value can be detected, based on the change of the electric resistance value.

Figure 9:
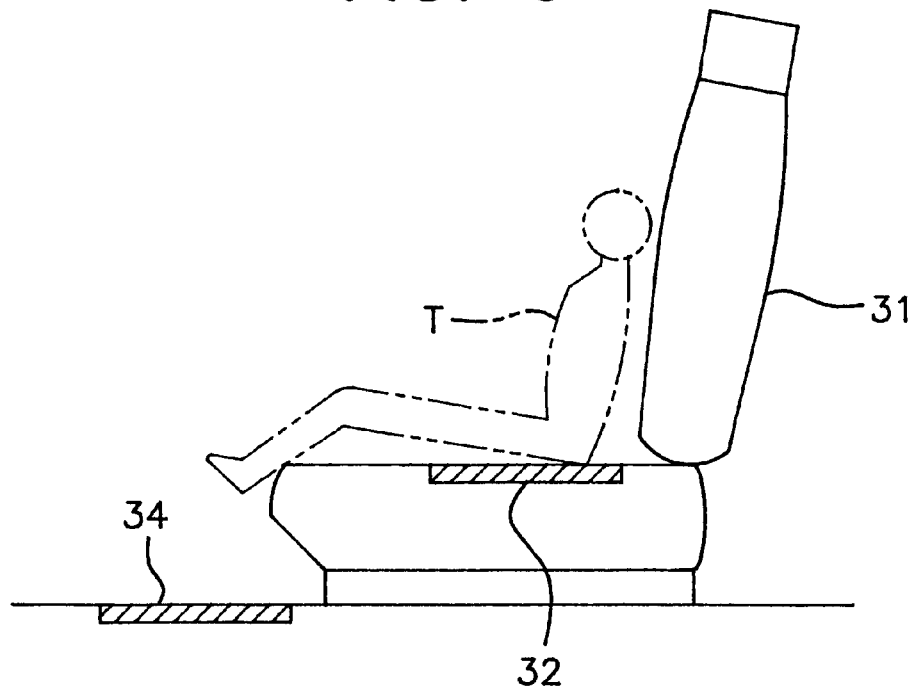
FIG. 9 is a side elevational view showing a condition in that a child, whose feet do not reach a vehicle floor, is seated on a vehicle seat provided with the seating detection device of the fourth embodiment.
Figure 10:
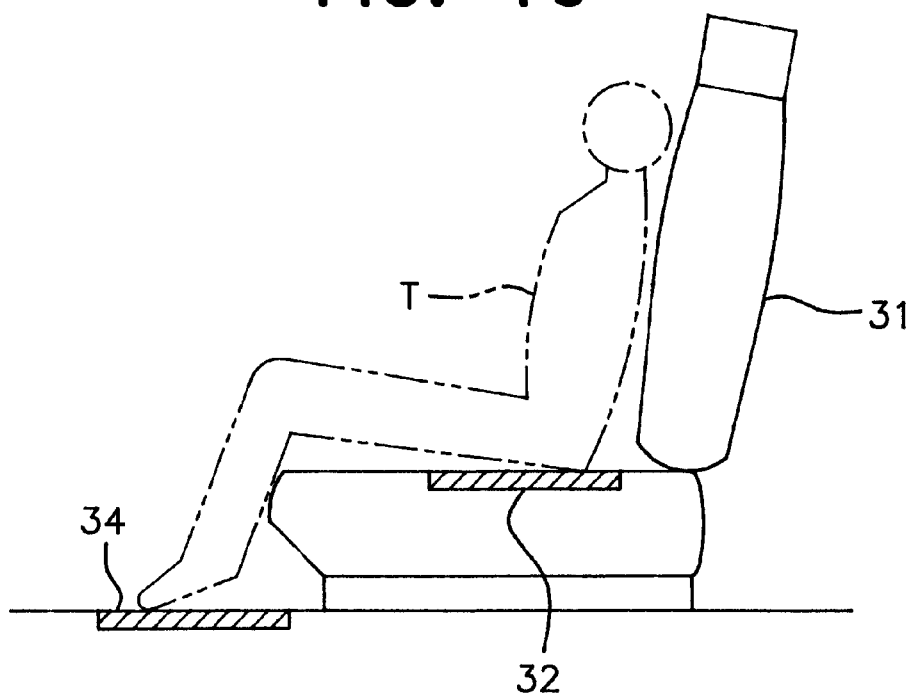
FIG. 10 is a side elevational view showing a condition in that a child, whose feet can reach the vehicle floor, is seated on the seat provided with the seating detection device of the fourth embodiment.
Figure 11:
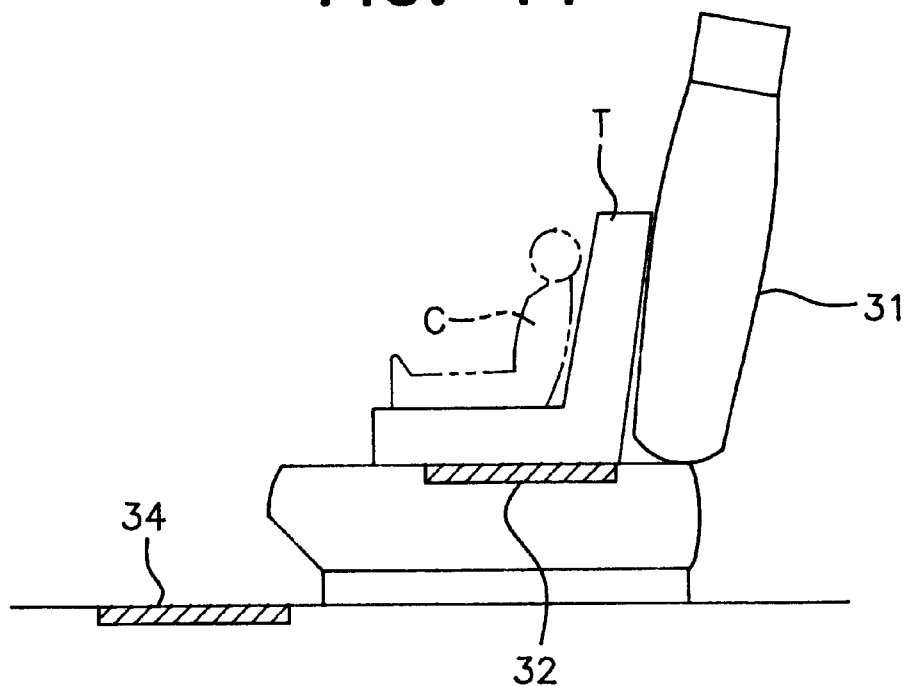
FIG. 11 is a side elevational view showing a condition in that a child seat, on which an infant is seated, is placed on the seat provided with the seating detection device of the fourth embodiment.
Figure 12:
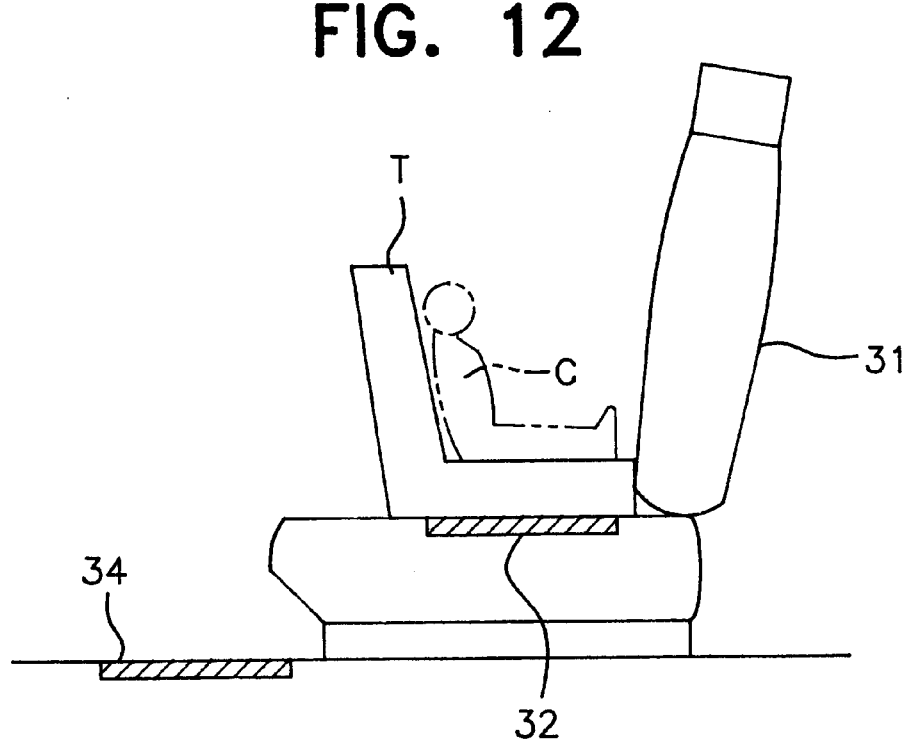
FIG. 12 is a side elevational view showing a condition in that a child seat, which is oriented in a direction opposite to that in FIG. 11, is placed on the seat provided with the seating detection device of the fourth embodiment.
Figure 13:
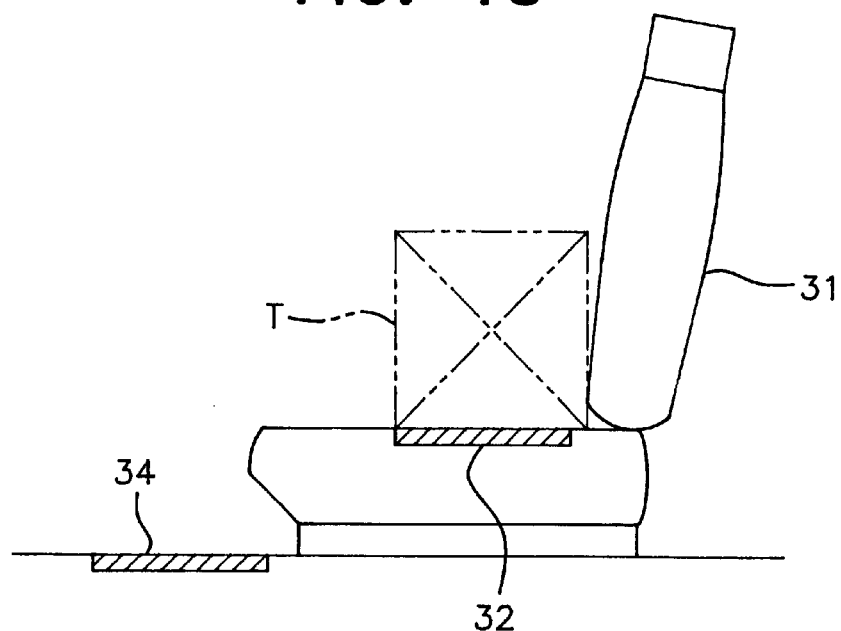
FIG. 13 is a side elevational view showing a condition in that an object is placed on the seat provided with the seating detection device of the fourth embodiment.

A procedure of determining the seated subject T with use of the seating detection apparatus according to the present invention is described hereinafter. In general, a foot is completely placed on the foot sensor 34 as shown in FIG. 7, if the subject T is an adult (the weight is heavier than or equal to 30 kg). If the subject T is a child (lighter than 30 kg), the foot does not reach the foot sensor 34 as shown in FIG. 9; otherwise, the foot is merely in slight contact with the foot sensor 34 as shown in FIG. 10 even though the child's foot reaches the foot sensor 34. In a case where the subject T is a child seat, nothing is in contact with the foot sensor 34 as shown in FIGS. 11 and 12, regardless of the direction of the child seat T and that of the infant C. Further, only the child seat T may be in contact with the hip sensor 32, and the infant C is not in contact therewith. Still further, if the subject T is a baggage, the baggage T is not in contact with the foot sensor 34, although the baggage T is in contact with the hip sensor 32, as shown in FIG. 13.

Therefore, output signal of each of the hip sensor 32 and the foot sensor 34 can be classified as shown in Table -1:

TABLE 1

| Sensor | Subject | | |
| --- | --- | --- | --- |
| | Adult (≧30 kg) | Child (<30 kg) | Object (Childseat) |
| Hip sensor | Middle–High | Middle | Low |
| Foot sensor | Middle–High | Zero–Low | Zero |

As shown in Table-1, the output signals of the hip sensor 32 and foot sensor 34 indicate middle or high values, respectively, if the subject T is an adult person. If the subject T is a child, the output signal of the hip sensor 32 indicates a middle value whereas that of the foot sensor 34 indicates zero or a low value. If the subject T is an object such as a child seat, the output signal of the hip sensor 32 indicates a low value and that of the foot sensor 34 indicates zero.

The subject T can be determined as shown in Table-2 below in accordance with differences shown in Table-1.

TABLE 2

| Output (Hip sensor) | Output (Foot sensor) | Recognition |
| --- | --- | --- |
| Middle–High | Middle–High | Adult (≧30 kg) |
| Middle | Zero–Low | Child (<30 kg) |
| Low | Zero | Object |
| Zero | Zero | Absence |

That is, the subject T is recognized to be an adult when the output signals of the hip and foot sensors 32, 34 are indicative of a range from middle value to high value, and the subject T is recognized to be a child when the output signal of the hip sensor 32 is indicative of the middle range and that of the foot sensor 34 is indicative of a value ranging from zero to a low value. Further, the subject T is determined to be an object when the output signal of the hip sensor 32 indicates a low value and that of the foot sensor 34 indicates zero, and absence of the subject T is determined when both of the output signals of the hip and foot sensors 32, 34 are zero.

Now, an experiment conducted by the present inventors with use of the seating detection device according to the present invention is explained in detail. In this experiment, sensors for detecting a pressure distribution are interposed between a surface sheet of a front passenger's seat of a vehicle and a pad therein, and positioned beneath a carpet on a vehicle floor, respectively, whereby output signals of the hip and foot sensors 32, 34 are recorded under the condition shown in Table-3. Further, Table-4 shows the results of output signals obtained thereby.

TABLE 3

| Condition | Human/Object | weight | Height | weight |
| --- | --- | --- | --- | --- |
| 1 | Adult | 45 kg | 1.54 m | — |
| 2 | Child | 30 kg | 1.37 m | — |
| 3 | Childseat | — | — | 9.6 kg + Weight of 10 kg |
| 4 | Child | 15 kg | 1 m | — |

TABLE 4

| Condition | Output (Hip sensor) | Output (Foot sensor) |
| --- | --- | --- |
| 1 | High | Low–High |
| 2 | Middle–High | Zero |
| 3 | Low–Middle | Zero |
| 4 | Low–Middle | Zero |

Figure 14:
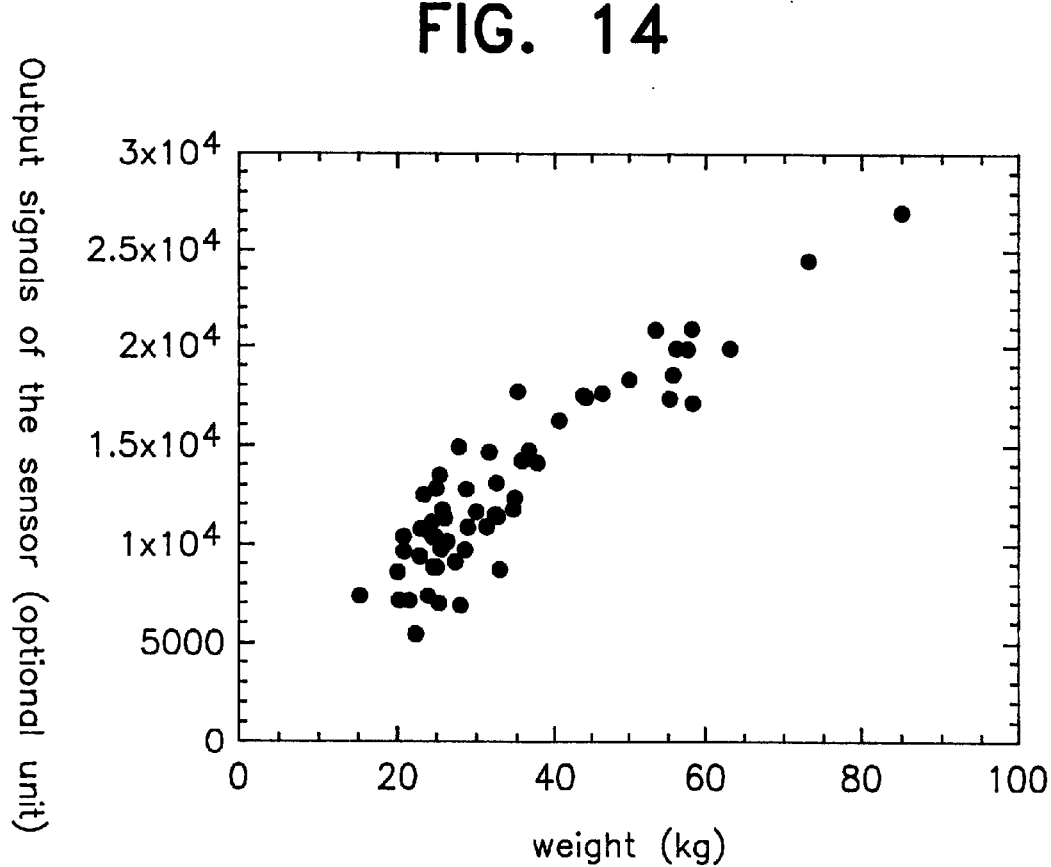
FIG. 14 is a graphical representation showing variations of output signals of the sensor in relation to variations of body weight of a person on the seat.

FIG. 14 is a graphic diagram showing relationship between the weight of an occupant on the seat and the intensity of an output signal of the hip sensor 32. As seen from FIG. 14, the intensity of the output signals of the hip sensor 32 increases in proportion with the weight of the occupant on the seat.

Further, the present inventors conducted an experiment in which the output signals are measured in a condition that a child seat of 7.4 is placed on the seat with an additional weight of 15 kg being further placed on the child seat (total weight is 22.4 kg) and in a condition that a child of 22.7 kg is seated on the seat, respectively. The results thereof are shown in Table-5.

TABLE 5

| | Total Weight | weight | Height | Output (Sensor) (optional unit) |
| --- | --- | --- | --- | --- |
| Childseat + Weight | 22.4 kg | — | — | 4220 |
| Child | — | 22.7 kg | 1.17 m | 5460 |

As is understandable from Table-5, the output signals of the hip sensor 32 in a case of the child on the seat indicates higher values than that in a case of the child seat with the additional weight, even if the total weight of each case is substantially equal to each other. This is because the difference in the stiffness between the hip of the child (human) and the child seat (object) results in the difference of the intensity in the output signals of the sensor, even if those have the same weight. (In this embodiment, softer material results in more intensified output signals of the sensor.) Therefore, determination on whether the subject T is a human or an object can be practiced, based on the resultant output signals of the hip sensor 32.

According to the present invention, the hip sensor 32 attached to the seat 31a of the vehicle seat 31, the foot sensor 34 attached to the floor 33 forward of the vehicle seat 31, and the subject determination means 35 for determining the subject T on the basis of the pressures detected by the hip and foot sensors 32, 34 are provided, so that an ensured determination can be made as to whether the subject T on the vehicle seat is a human or an object, and whether the human is an adult or a child.

The subject determination means 35 can control the inflator 37 of the air bag 36, so that the subject determination means 35 permits the inflator 37 to normally operate when it detects presence of an adult as being the subject T, and on the other hand, it adjusts or switches the air bag 36 so as to weaken its inflation force or render inflator 37 inoperative, when presence of a child is detected as being the subject T. Thus, an accident, e.g., an occasion in which a child on a front passenger's seat is pressed by the air bag 36, can be prevented from occurring.

Further, the seating detection device can determine whether the subject T is a human or an object by means of the subject determination means 35, so that it can render the inflator 37 to be inoperative when it recognizes presence of an object as being the subject T. Therefore, somewhat useless expenses involved in replacement of the air bag 36, repair works of the instrument panel or the like, or damages of the object can be avoided.

The size or configuration of the hip and foot sensors 32, 34, and the number of the row electrodes 41, the line electrodes 42 and the pressure sensitive sensors 43 are not limited to those illustrated on the drawings, but it can be appropriately modified. In addition, the seating detection device of the present invention can be applied to the driver's seat, rear seat and the like as well as the front passenger's seat.

Further, the seating detection device of the present invention can be connected with various kinds of devices, e.g., devices for automatically adjusting seat positions, inclination of the seat back, positions of the steering wheel and the like, as well as the inflator 37 of the air bag 36.

A seating detection device of a fifth embodiment according to the present invention is described with reference to FIGS. 15 and 16, FIG. 15 being a side elevational view schematically showing the seating detection device of the fifth embodiment and FIG. 16 being a plan view schematically showing a pressure sensitive section of the seating detection device of the fifth embodiment.

Figure 15:
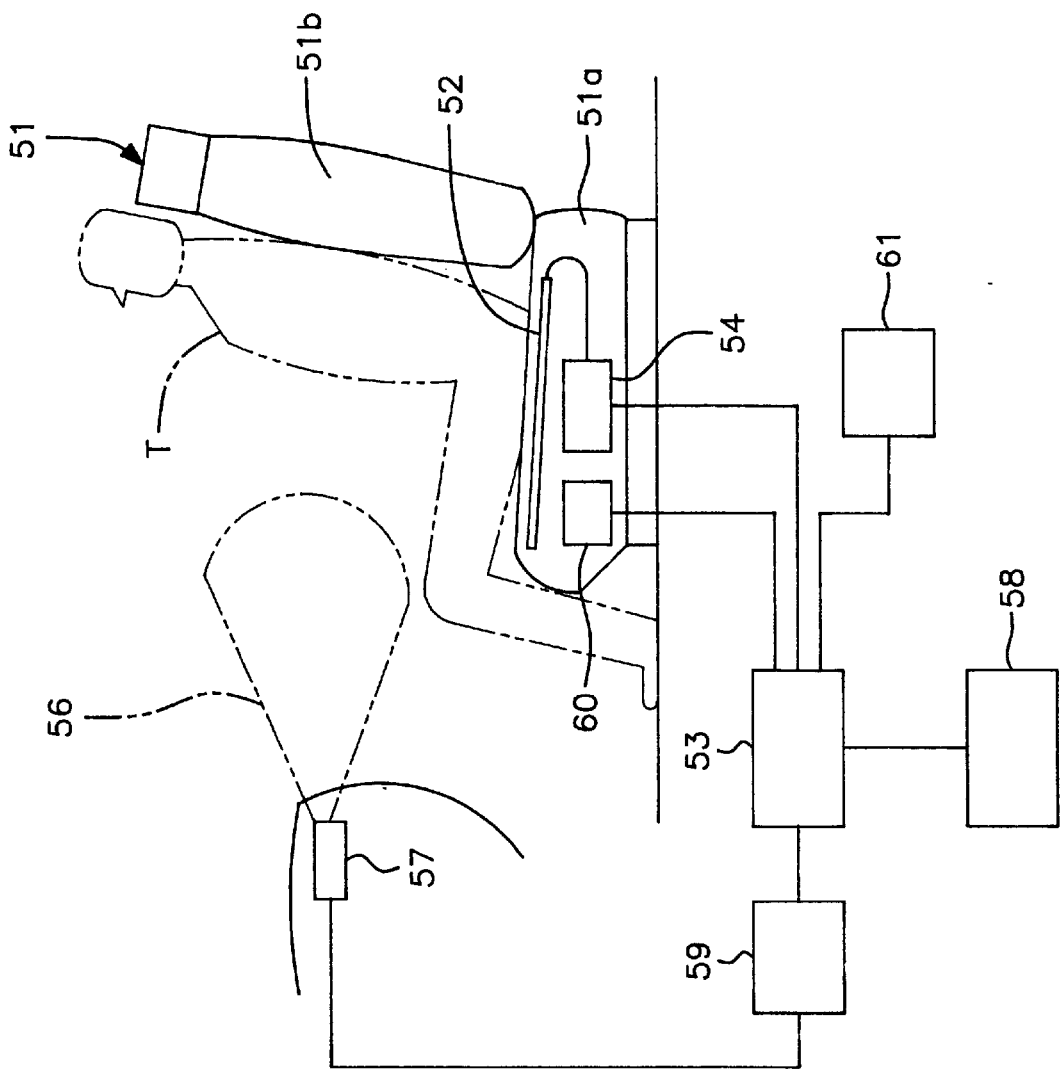
FIG. 15 is a side elevational view schematically showing the seating detection device of a fifth embodiment according to the present invention.
Figure 16:
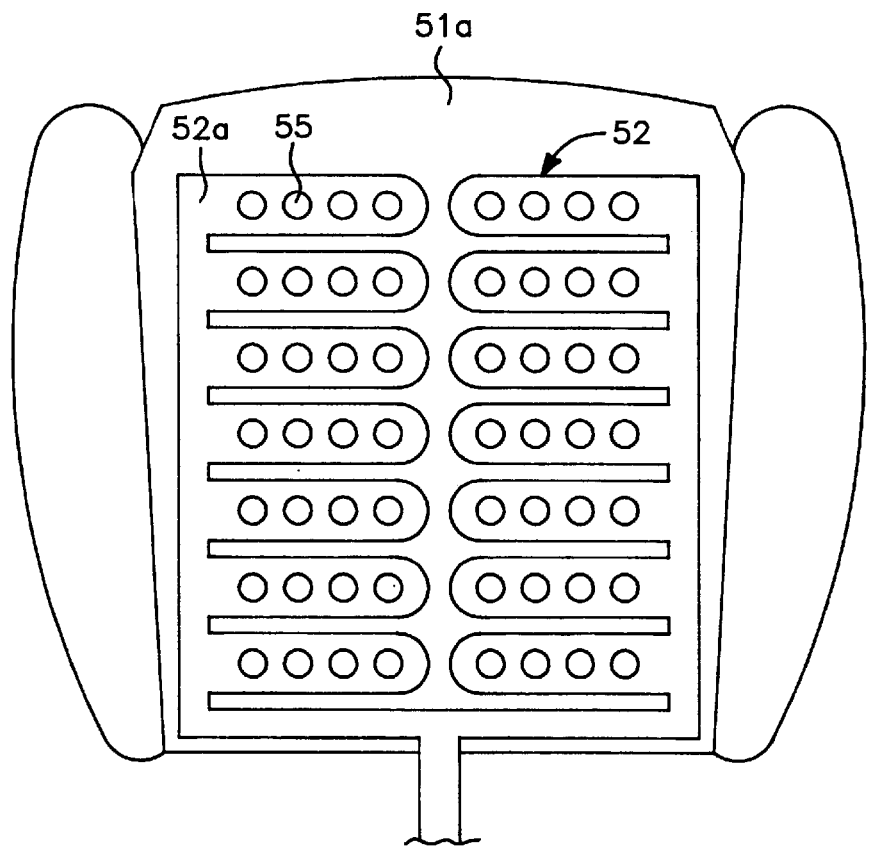
FIG. 16 is a plan view schematically showing a pressure sensitive section of the seating detection device of the fifth embodiment.

As shown in FIG. 15, the seating detection device is provided with a pressure sensitive sensor 52 located at least on a seat cushion part 51a of the automotive vehicle seat for sensing the pressure of the subject T on the seat, and subject determination means 53 for determining what the subject T is, based variation with time on the pressures sensed by the pressure sensitive sensor 52.

The pressure sensitive sensor 52 is interposed between the surface fabric of the seat cushion part 51a and a urethane foam therein. As illustrated on FIG. 16, the pressure sensitive sensor 52 has a number of sensing elements 55 carried on a pair of elastic members 52a which are shaped in a comb-like form, respectively and oppositely arranged. The sensing elements 55 are spaced apart an equal distance from each other in a formation of a two-dimensional matrix. In response to the physical figures of the occupant on the seat cushion part 51a, or the size and weight of the baggage placed thereon, pressures are applied on the sensing elements 55 arranged in a matrix formation. Each of the sensing elements 55, e.g., made of a material variable in its electric resistance in response to a magnitude of the pressure, detects the pressure in accord with the variation of the electric resistance.

The subject determination means 53 is coupled with an inflator 57 of an air bag 56, e.g., by means of inflation control means 59 so as to control the operation of the inflator 57, based on the results of determination. The subject determination means 53 is further connected with a measuring unit 54 which measures the pressures sensed by the pressure sensitive sensor 52, and a memory 58 for storing data, such as reference values on the basis of which the determination is made.

The subject determination means 53 and the measuring unit 54 are rendered to be a standby condition as a door beside the seat is opened, and measure variations with time on the pressures applied to the sensing elements 55 immediately after the opening of the door. The measuring time period is set to be in a range from a few seconds to a few deca-seconds, practically five seconds to thirty seconds, preferably ten seconds to twenty seconds.

The subject determination means 53 determines whether the subject T is a human or an object, with reference to the variation with time on the pressures detected by the pressure sensitive sensor 52, the variation with time on the pressure distribution of the pressure sensitive sensor 52, and the like. The subject determination means 53 simultaneously measures at least two items of the variations and, if the variation with time is recognized as to at least one item, it determines that the subject T is a human. Further, the subject determination means 53 measures the width of the hip from the pressure distribution of the pressure sensitive sensor 52 so as to determine the physical figure of the subject T.

The operation of the seating detection device is described hereinafter.

As the door beside the seat is opened, the measuring unit 54 and the subject determination means 53 are set to be a standby condition, so that measurement of the variation with time on the pressures acting on the pressure sensitive sensor 52 are initiated immediately after closing action of the door. The occupant generally changes the position immediately after closing the door while fastening the seat belts or adjusting the position of the vehicle seat, and therefore, the pressures on the sensor 52 change. For this reason, the measuring period is set to be a range from five seconds to thirty seconds, preferably ten seconds to twenty seconds after closing of the door, as described above.

The measuring unit 54 measures the variation with time on the pressures acting on the pressure sensitive sensor 52, the variation with time on the numbers of the pressed sensor elements 55, and the variation with time on the center of gravity in the pressure distribution of the pressure sensitive sensor 52. The results of measurement are inputted into the subject determination means 53 so that a determination procedure is conducted.

If no pressure is applied on the sensor elements 55 of the pressure sensitive sensor 52, the subject determination means 53 determines absence of any subject on the seat 51.

If any pressure acting on the sensor elements 55 of the pressure sensitive sensor 52 and any variation with time on the pressure are detected, it means that any action of position change is taken, and therefore, the subject determination means 53 determines presence of a human on the seat. In such a case, if variation with time on the pressure is detected to be substantially constant, the subject determination means 53 determines presence of an object on the seat. That is, at least two items of the variation with time are simultaneously detected in the determination process and, if the variation with time is recognized with respect to at least one item, presence of a human on the seat is determined.

Further, the subject determination means 53 is able to obtain information on the width of hip of the occupant in relation to the pressure distribution detected by the pressure sensitive sensor 52, so that a determination can be made as to whether the subject T is physically a big figure or a small figure, based on the hip width.

If the subject determination means 53 determines absence of any subject on the seat or presence of an object thereon, the inflator 57 is controlled to be kept inoperative. Thus, the air bag 56 would not inflate in a crash condition of the vehicle. It follows that useless expenses involved in a replacement of the air bag 56 or repair works of the instrument panel, or damages of the object are avoidable.

If the subject determination means 53 determines presence of a subject on the seat being a small person such as a child, the inflator 57 is controlled to be kept inoperative; otherwise, e.g., the inflation force of the air bag 56 is weakened. Thus, an accident in which a child on the passenger's seat is pressed by the air bag 56 can be prevented from occurring.

On the other hand, if the subject determination means 53 determines presence of a relatively big person, such as an adult, on the seat, the inflator 57 is controlled to be normally operative.

In addition to the pressure sensitive sensor 52, a temperature sensor, which comprises a temperature sensitive element or the like, may be provided in position so as to detect a body temperature of the subject (human) on the seat, whereby a determination can be made as to whether any occupant is seated on the seat. Thus, a more accurate determination with respect to the subject T can be achieved.

The pressure sensitive sensor 52 may be provided in the seat back part 51*b* functioning as a backing support, as well as the seat cushion part 51*a*.

The seating detection device of the present invention may be applied to a driver's seat or a rear seat as well as the front passenger's seat, and it can be connected with various kinds of devices, such as devices for automatically adjusting the position of the seat, the inclination of the seat back, the position of a steering wheel or the like, as well as the inflator 57 for the air bag 56.

Further, as shown in FIG. 15, a seat belt fastening motion detector 60 for detecting a fastening motion of the seat belt by the occupant may be provided to confirm occupant's use of the seat belt, and the detection device 60 may be connected with the subject determination means 53, whereby determination on the presence or absence of occupant can be more accurately practiced. Still further, the seat position adjusting motion detector 61 for detecting an occupant's motion adjusting the seat position may be provided to be connected with the subject determination means 53, whereby determination on the presence or absence of occupant can be more precisely performed.

The present inventors conducted an experiment with use of the seating detection device according to the fifth embodiment, wherein variations with time on the load applied to the seated surface, coordinate values of the center of gravity and the numbers of pressed sensor were measured in a case of an occupant seated on a front passenger's seat and in a case of a baggage on the seat, respectively. In this experiment, a pressure sensitive sensor was used, which were defined by sensor elements of forty-four by twenty-nine (44×29) arranged in a matrix formation, and sampling of the output signals of the respective sensor elements were performed every second.

Figure 17A:
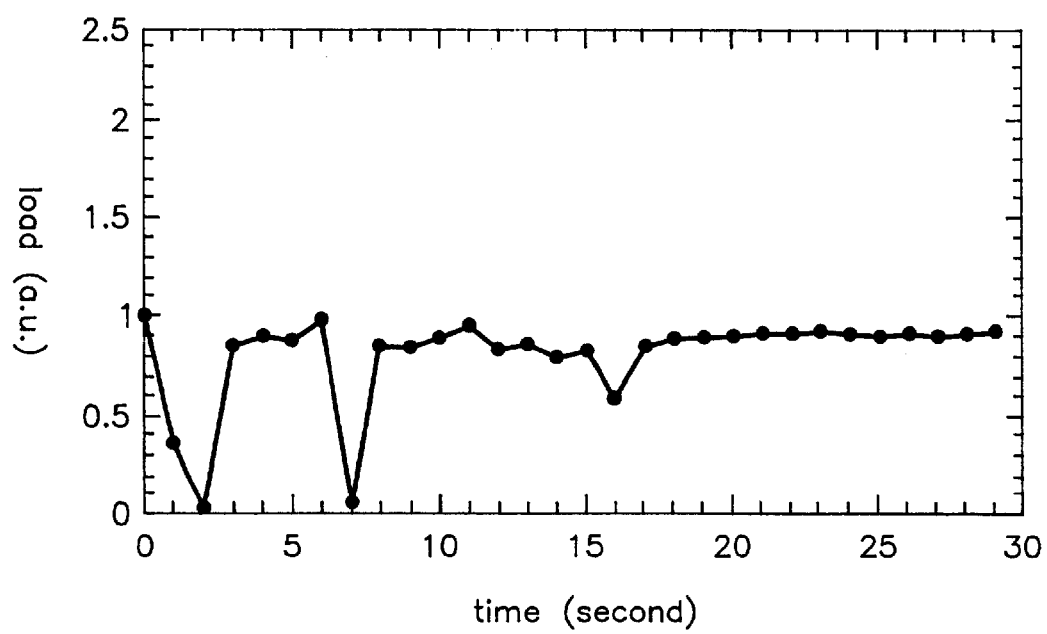
Figure 17B:
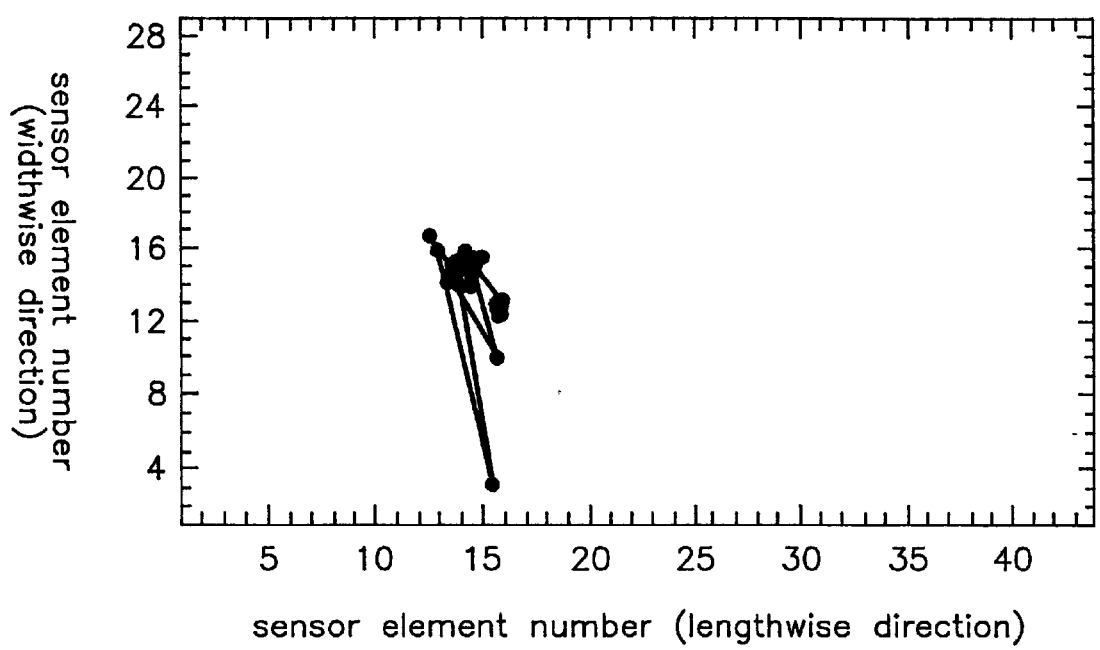
Figure 17C:
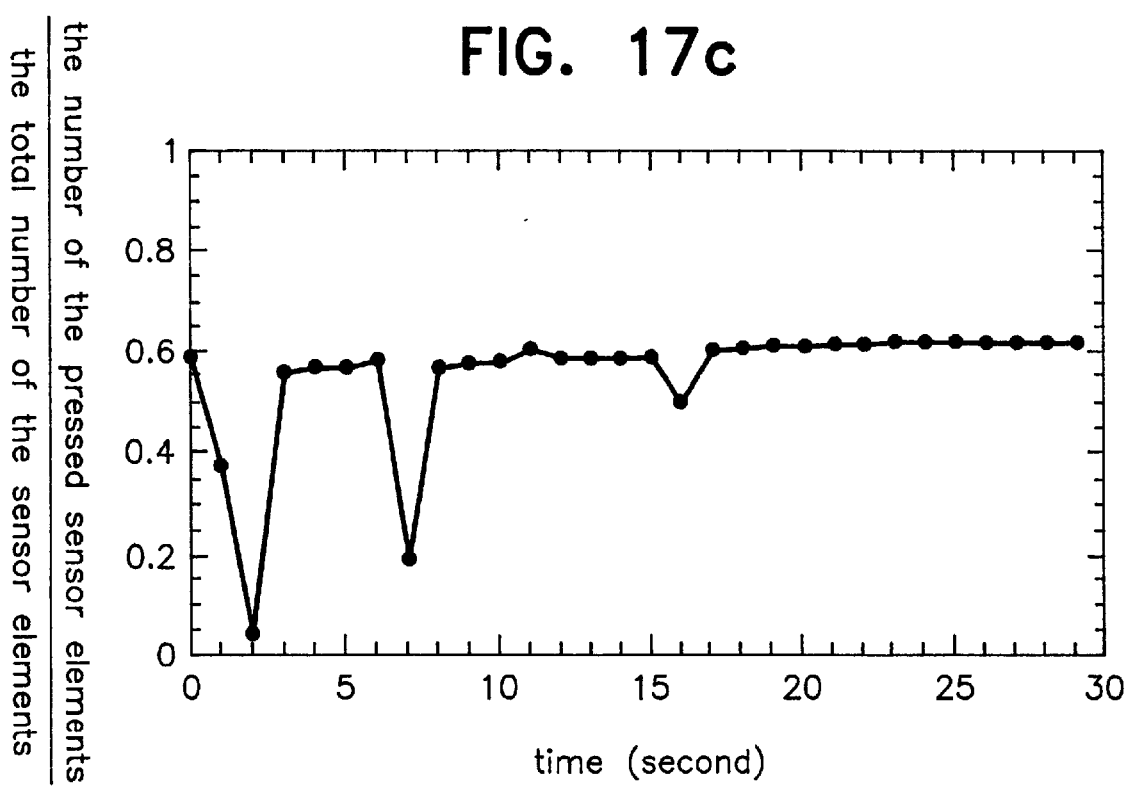

FIGS. 17(*a*), 18(*a*) and 19(*a*) are graphs showing variations with time on the load applied to the seated surface, wherein the load was measured for thirty seconds, the values firstly measured at the time of initiation being set to be "1". FIGS. 17(*b*), 18(*b*) and 19(*b*) are graphs showing variations on the center of gravity taken from the pressure distributions wherein the axis of abscissa indicates the sensor number of each of the sensor elements arranged in a lengthwise direction of the vehicle and the axis of ordinate indicates the sensor number of each of the sensor elements arranged in a widthwise direction of the vehicle, the front portion of the vehicle being set to be the right side of the graph. FIGS. 17(*c*), 18(*c*) and 19(*c*) are graphs showing the number of the pressed sensor elements measured for thirty seconds, the total number of the sensor elements being set to be "1".

FIG. 17 shows a case where an occupant is normally seated on the seat cushion part provided with the seating detection device of the present invention. As shown in FIG. 17, variations with time appear, as regards the load on the seated surface, coordinate values of the center of gravity and the number of the pressed sensors, respectively. Therefore, if the load on the seated surface, coordinate values of the center of gravity and the number of the pressed sensor vary with time, the subject can be recognized to be a human.

Figure 18A:
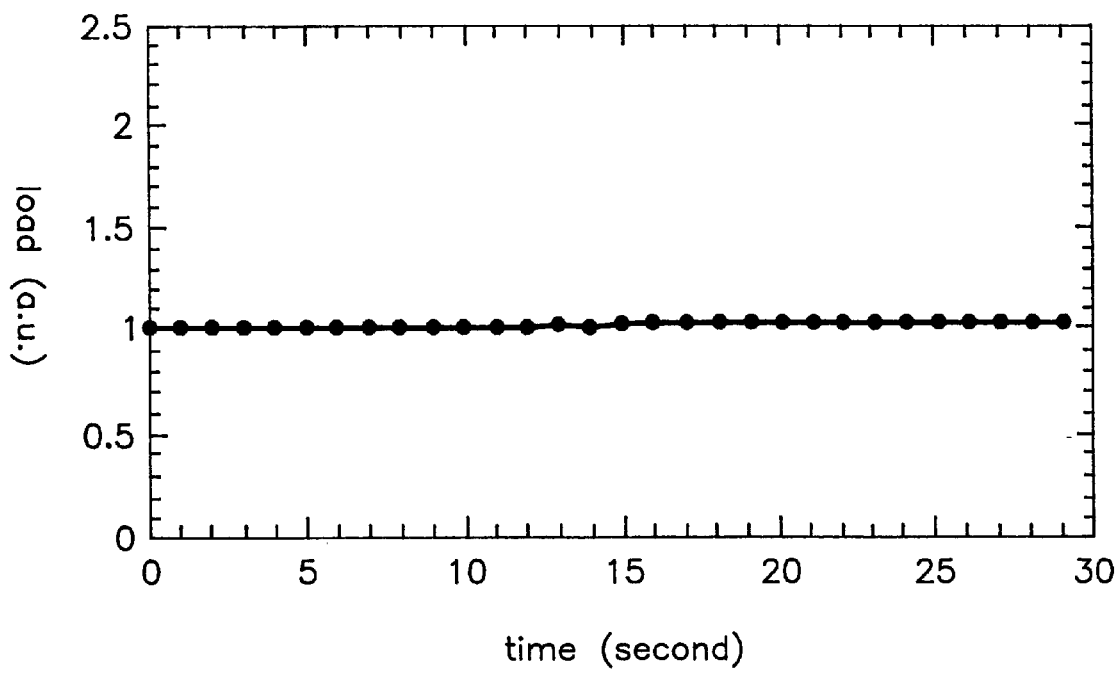
Figure 18B:
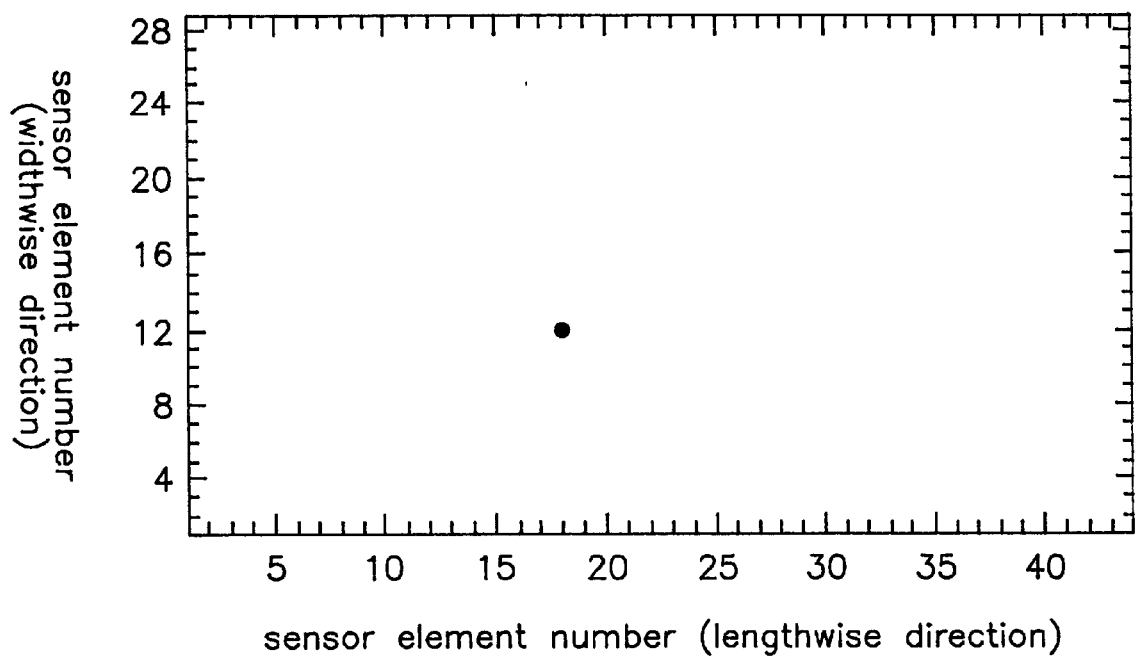
Figure 18C:
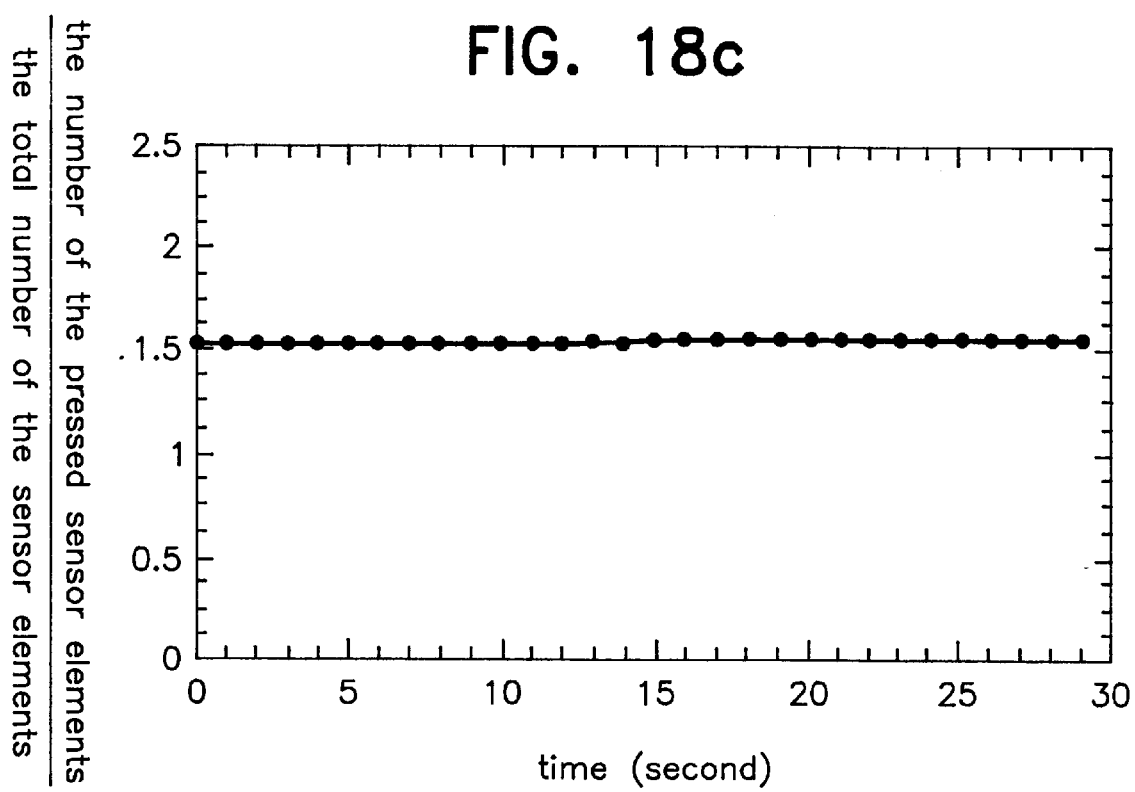

FIG. 18 shows a case where a baggage is placed on the seat cushion part provided with the seating detection device of the present invention. As shown in FIG. 18, all of the load on the seated surface, coordinate values of the center of gravity and the number of the pressed sensors are substantially constant since the beginning of the measuring procedure. In particular, the center of the gravity is entirely stationary. Therefore, if all of the load on the seated surface, positions of the center of gravity and the number of the pressed sensors are substantially constant, the subject can be recognized as being an object.

Figure 19A:
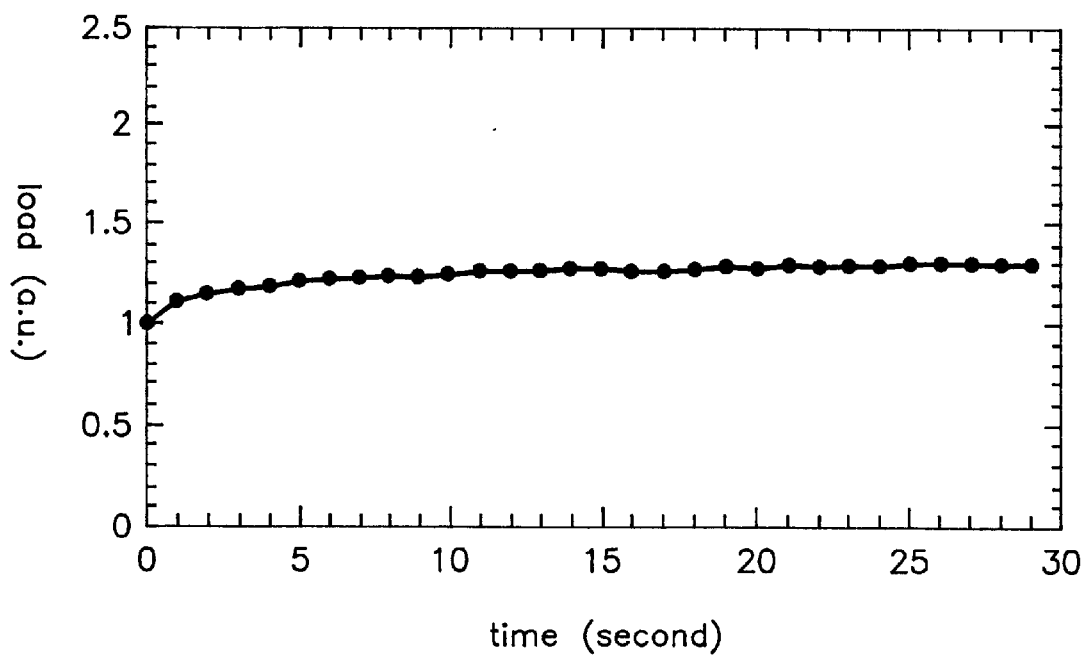
Figure 19B:
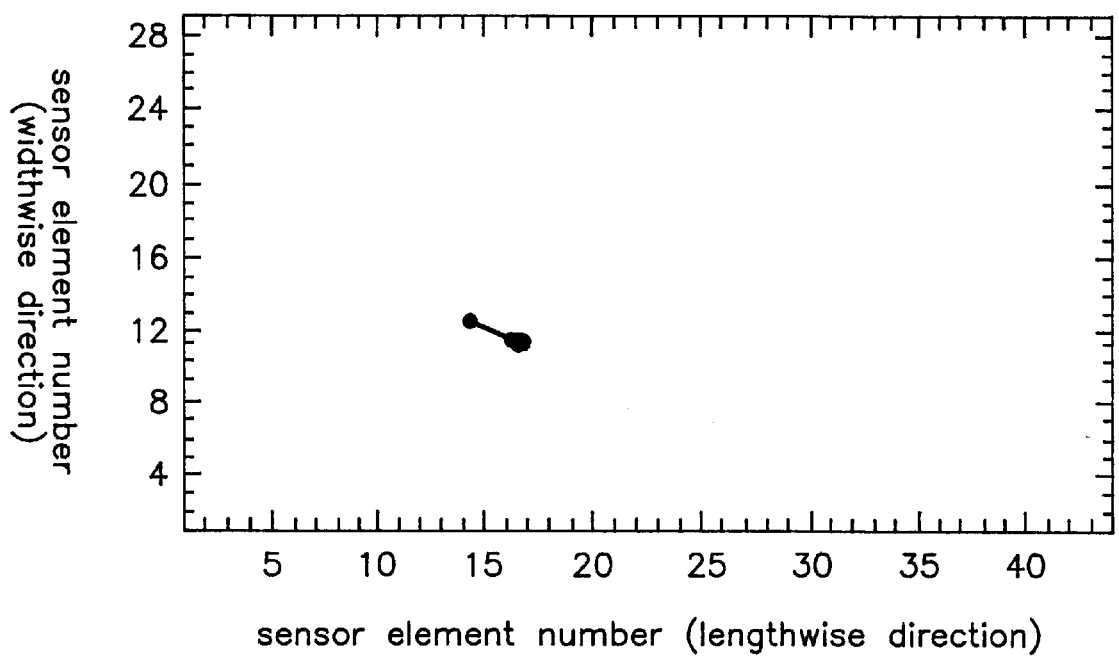
Figure 19C:
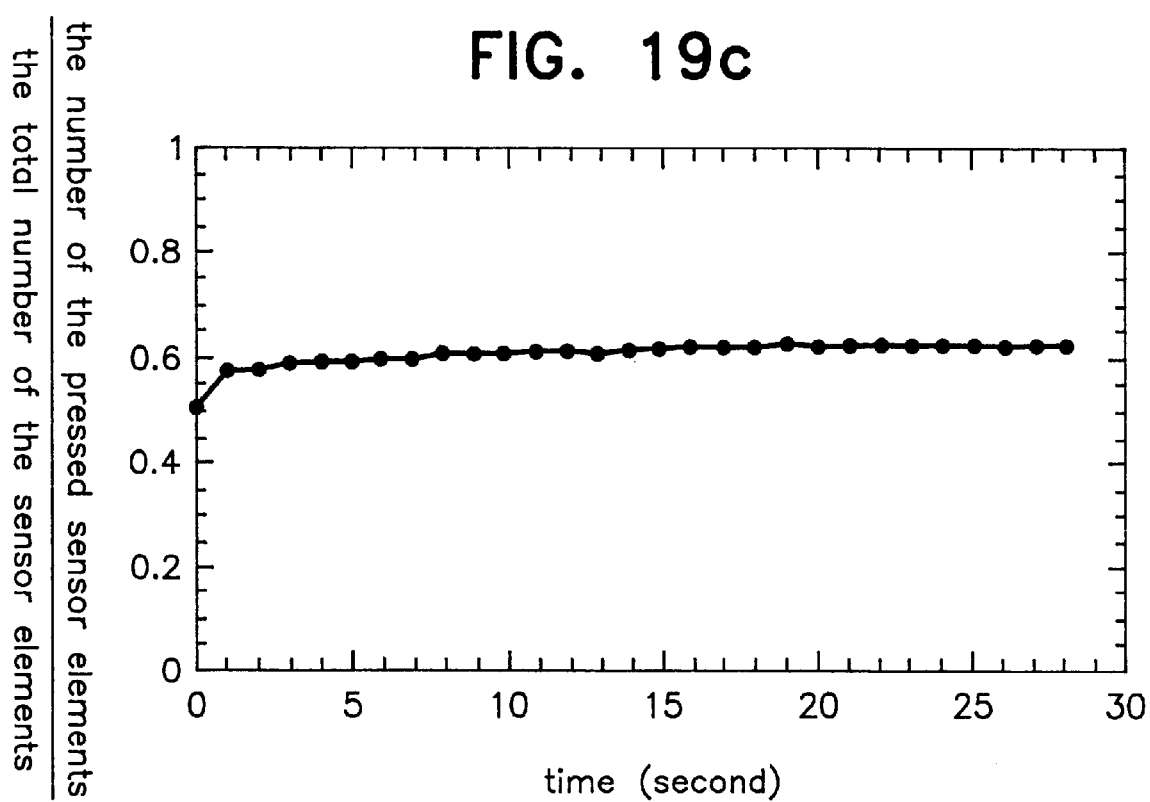

FIG. 19 shows a case where an occupant is slowly seated on the seat cushion part provided with the seating detection device of the present invention. As shown in FIG. 19, slight variations with time appear immediately after the beginning of measuring procedure, as regards all of the load on the seated surface, coordinate values of the center of gravity and the number of the pressed sensors, and thereafter, they are kept substantially constant. However, the coordinate values of the center of gravity apparently vary. Therefore, measurement of variation with respect to the coordinate values of the center of gravity enables determination as to whether the subject is a human, even if the occupant is slowly seated on the seat.

Figure 20:
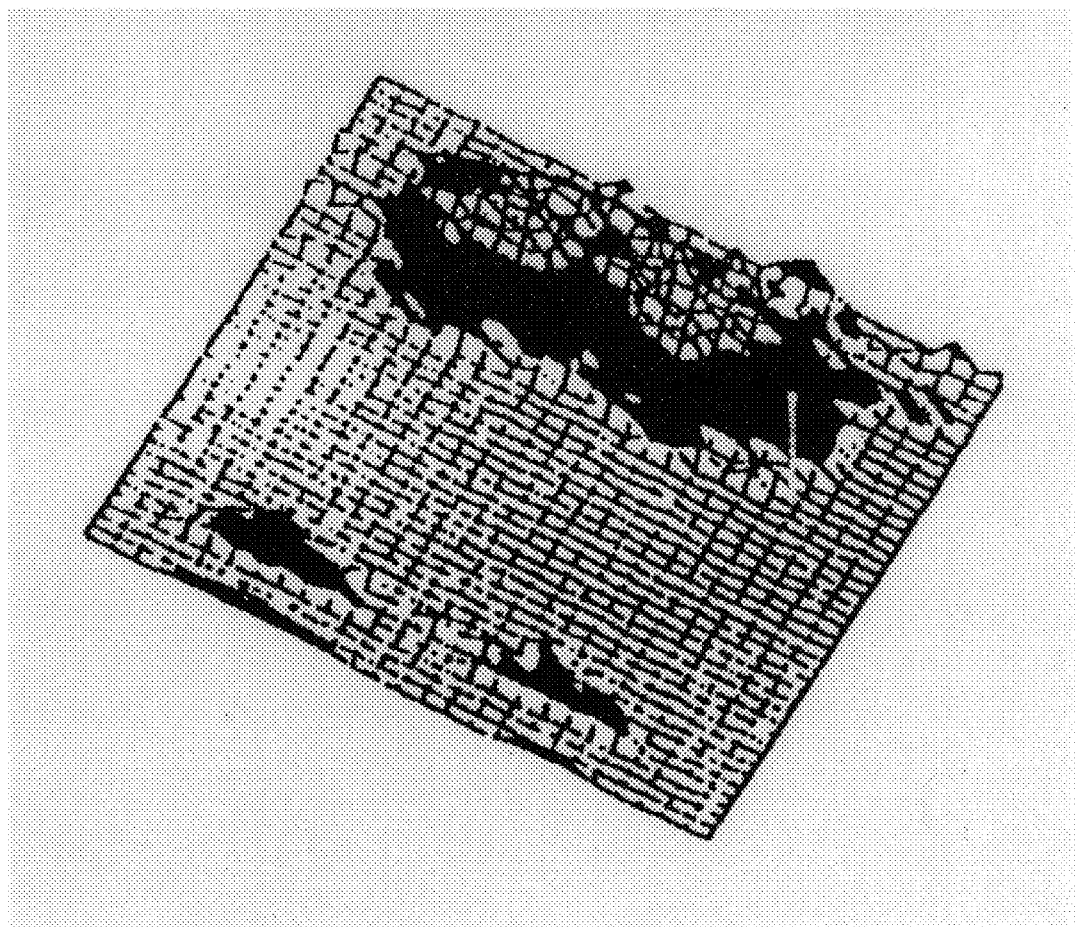
FIG. 20 is a pressure distribution chart depicted in a three dimensional manner, which is taken in a condition that an infant is seated on the seat cushion part provided with the seating detection device of the fifth embodiment.
Figure 21:
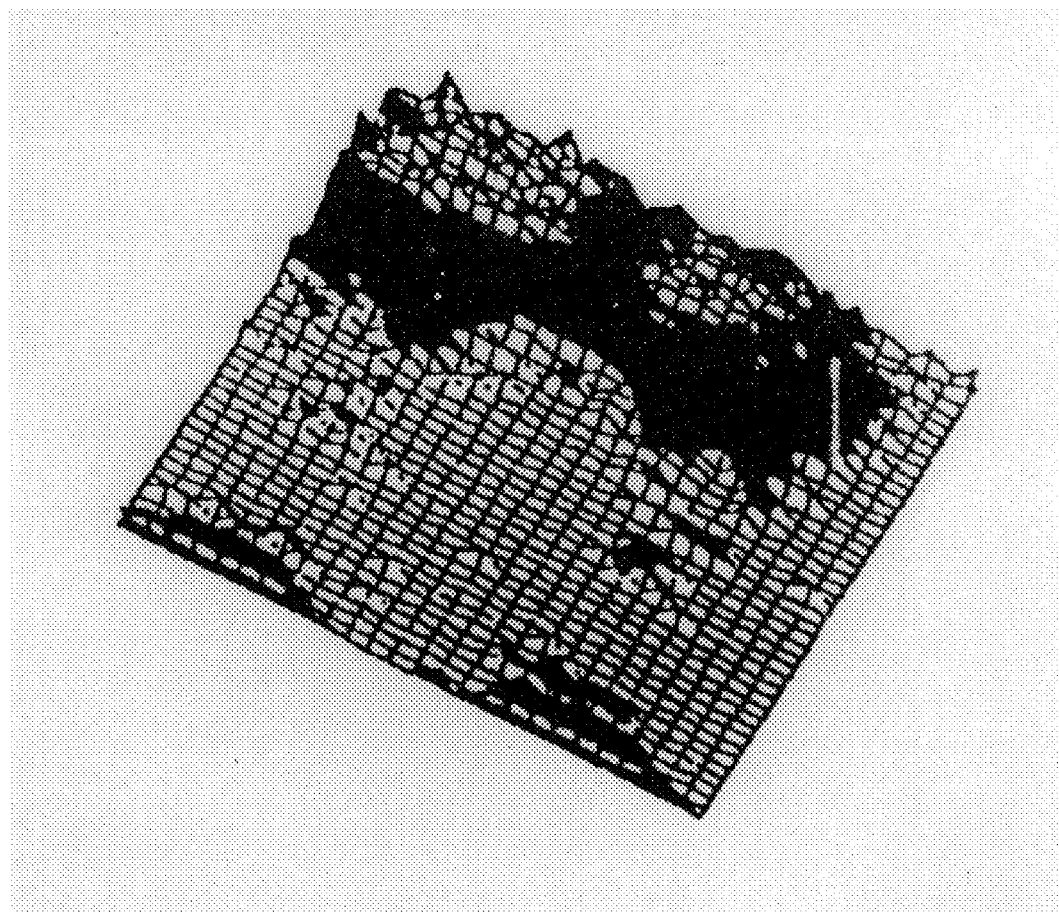
FIG. 21 is a pressure distribution chart depicted in a three dimensional manner, which is taken in a condition that a child is seated on the seat cushion part provided with the seating detection device of the fifth embodiment.
Figure 22:
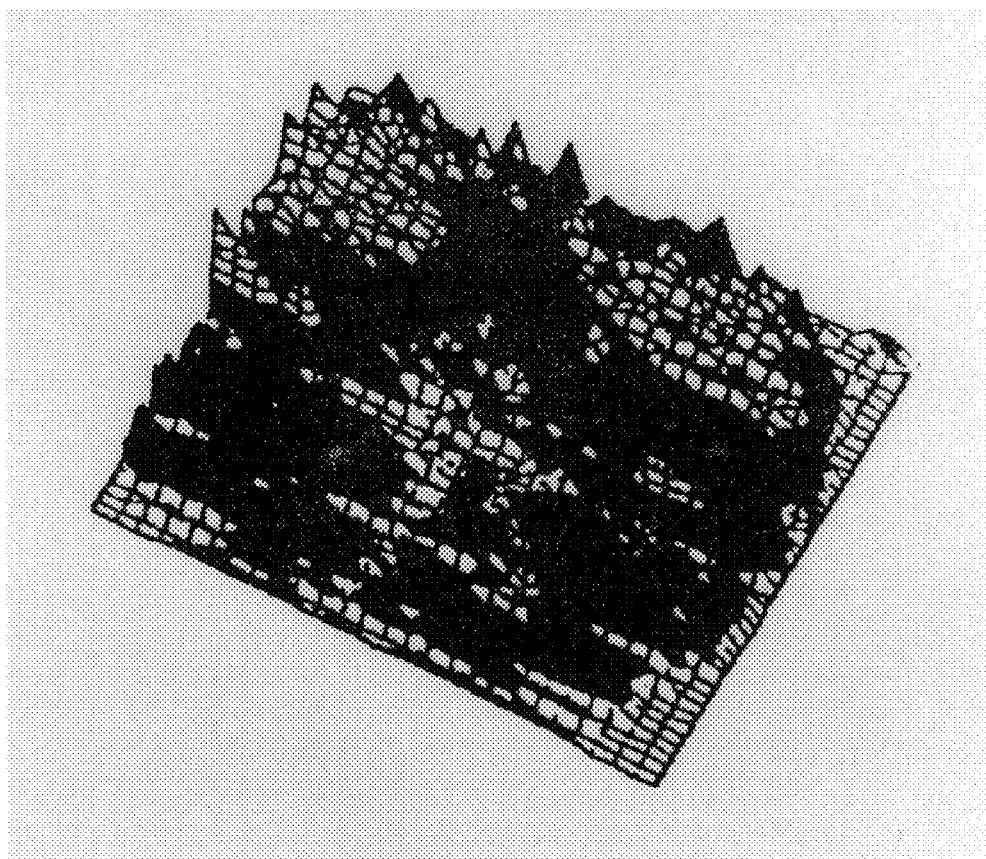
FIG. 22 is a pressure distribution chart depicted in a three dimensional manner, which is taken in a condition that an adult is seated on the seat cushion part provided with the seating detection device of the fifth embodiment.

The subject determination means 53 is capable of obtaining information on the width dimension of a hip in view of the pressure distribution of the pressure sensitive sensor 52 so as to determine physical figures of the subject T. For example, in a case where the occupant is an infant who is 1 m in height and 15.2 kg in weight, the pressure distribution appears as shown in FIG. 20 and the width of hip can be calculated to be 20 cm. In a case of the occupant who is 1.37 m in height and 22.9 kg in weight, the pressure distribution appears as shown in FIG. 21 and the width of hip can be calculated to be 25 cm. When the occupant is an adult who is 1.56 m in height and 45.5 kg in weight, the pressure distribution appears as shown in FIG. 22 and the width of hip can be calculated to be 27 cm.

Thus, such a calculation of the width of the hip allows determination on whether the physical figure of the subject T is relatively big or small.

Figure 23:
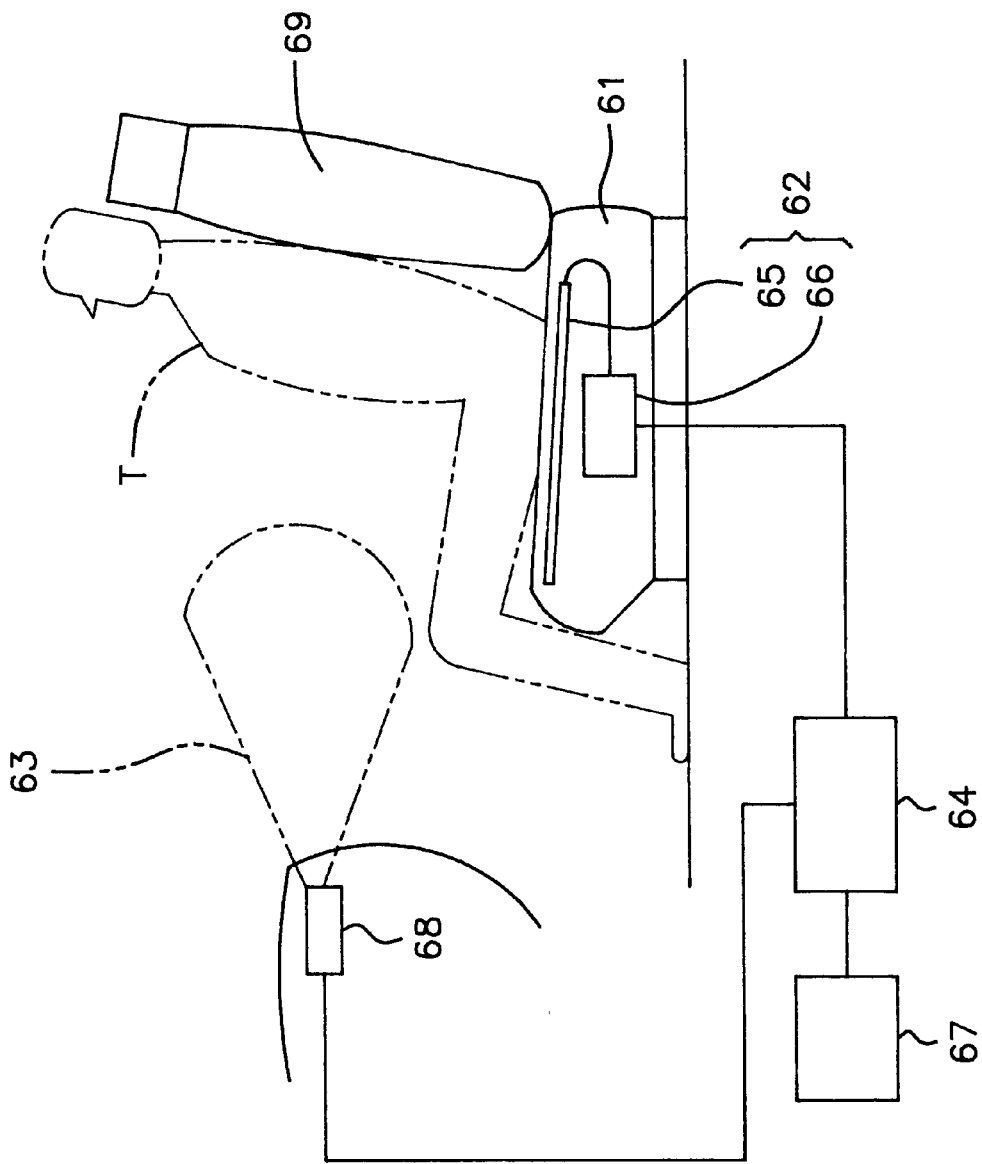
FIG. 23 is a schematic diagram illustrating an arrangement of an air bag apparatus of a sixth embodiment according to the present invention.

An air bag apparatus according to the sixth embodiment of the present invention is described hereinafter. As shown in FIG. 23, the air bag apparatus of the present invention comprises a sensing device 62 provided within a bench part 61 of a seat and control means 64 for controlling the operation of the air bag 63, such as practice of inflation action, and inflation force, speed and direction of the air bag 63.

The sensing device 62 is provided with a pressure sensitive sensor 65 for sensing the seating pressure of the occupant T and a processor 66 for measuring the pressure distribution in view of the seating pressure sensed by the pressure sensitive sensor 65 so as to determine a physical figure of the occupant T on the basis of a distance between two pressure peak points which reside in an area beneath the hip of the occupant.

Figure 24:
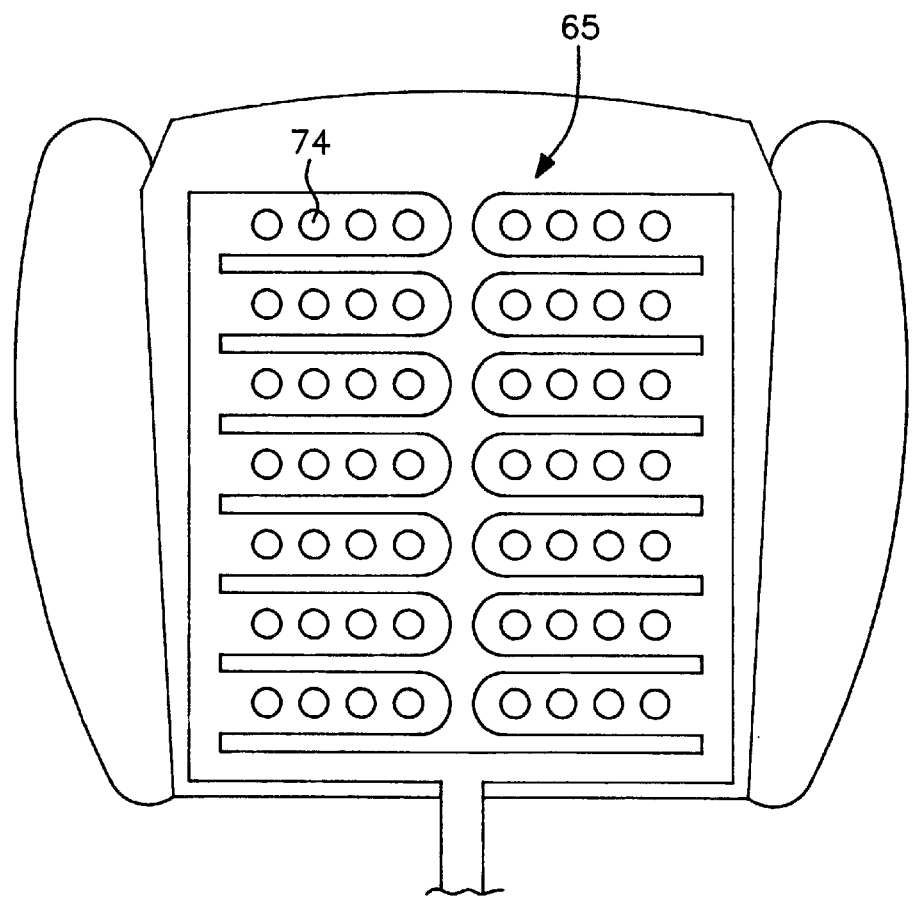
FIG. 24 is a schematic plan view of the pressure sensitive sensor constituting the air bag apparatus of the sixth embodiment.
Figure 25:
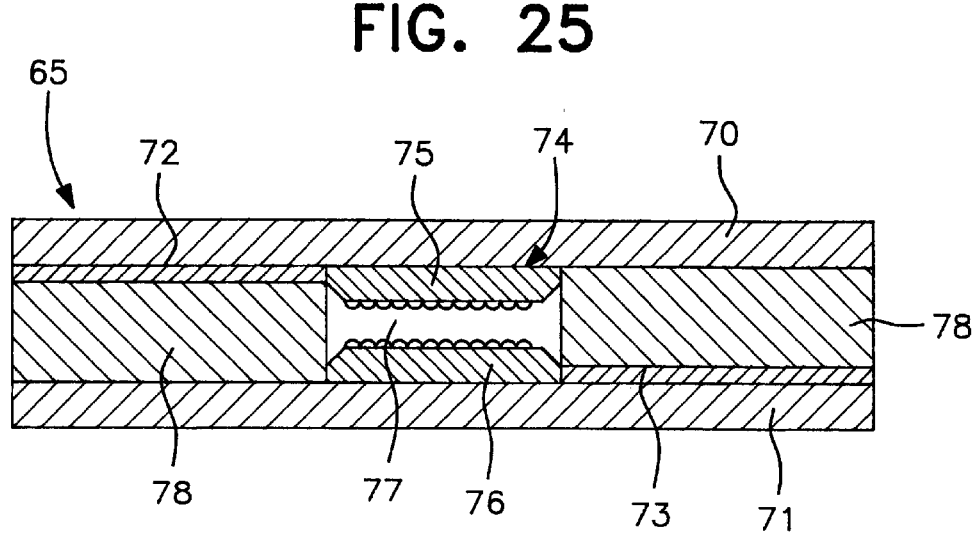
FIG. 25 is a cross-sectional view of the pressure sensitive sensor constituting the air bag apparatus of the sixth embodiment.

The pressure sensitive sensor 65 is positioned slightly below the surface of the bench portion 61. As is illustrated in FIGS. 24 and 25, the pressure sensitive sensor 65 comprises plastic films 70, 71, line electrodes 72 printed on the upper plastic film, row electrodes 73 printed on the lower plastic film and a sensor elements 74 which are located at the intersection of the line and row electrodes 72,73.

As a material of the plastic film 70, 71, the following plastics may be exemplified:

polyethylene terephthalate (PET); polyethylene naphthalate (PEN); polyether imide (PEI); polyimide (PI); polyphenylene sulfide (PPS); polyether sulfone (PES); polyether ether ketone (PEEK); polyarylate (PAR); polyamide-imide (PAI); poly-para-phenylene terepthalic amide (PPTA); fluorine plastics such as PTFE, PVDF, PFA, FEP, ETFE; polyethylene (PE); polypropylene (PP); polycarbonate (PC) polyamide (PA); polyvinyl chloride (PVC).

The line and row electrodes 72,73 may be formed by electric conductive ink including, as major constituents, metal powders such as silver powders or copper powders, which is printed on the plastic films 70, 71 by known printing means. Leading wires (not shown) connected with the line and row electrodes 72, 73 are coupled with the processor 66.

The sensor elements 74 include pressure sensitive ink 75 applied or printed on the upper plastic film 70 and pressure sensitive ink 76 applied or printed on the lower plastic film 71. The pressure sensitive ink 75, 76 includes semiconductive particles, so that it has a high electric resistance (nonconductivity) under nonpressurized conditions and varies in its electric resistance in accordance with increased pressure values as the pressure is applied. Since the surfaces of the pressure sensitive ink 75,76 has irregularity, a cavity 77 of a constant distance is provided therebetween, so that mutual adhesion thereof is prevented from occurring.

Viscous material layers 78 are provided between the line electrodes 72 and the lower plastic film 71 and between the row electrodes 73 and the upper plastic film 70, respectively.

Figure 26:
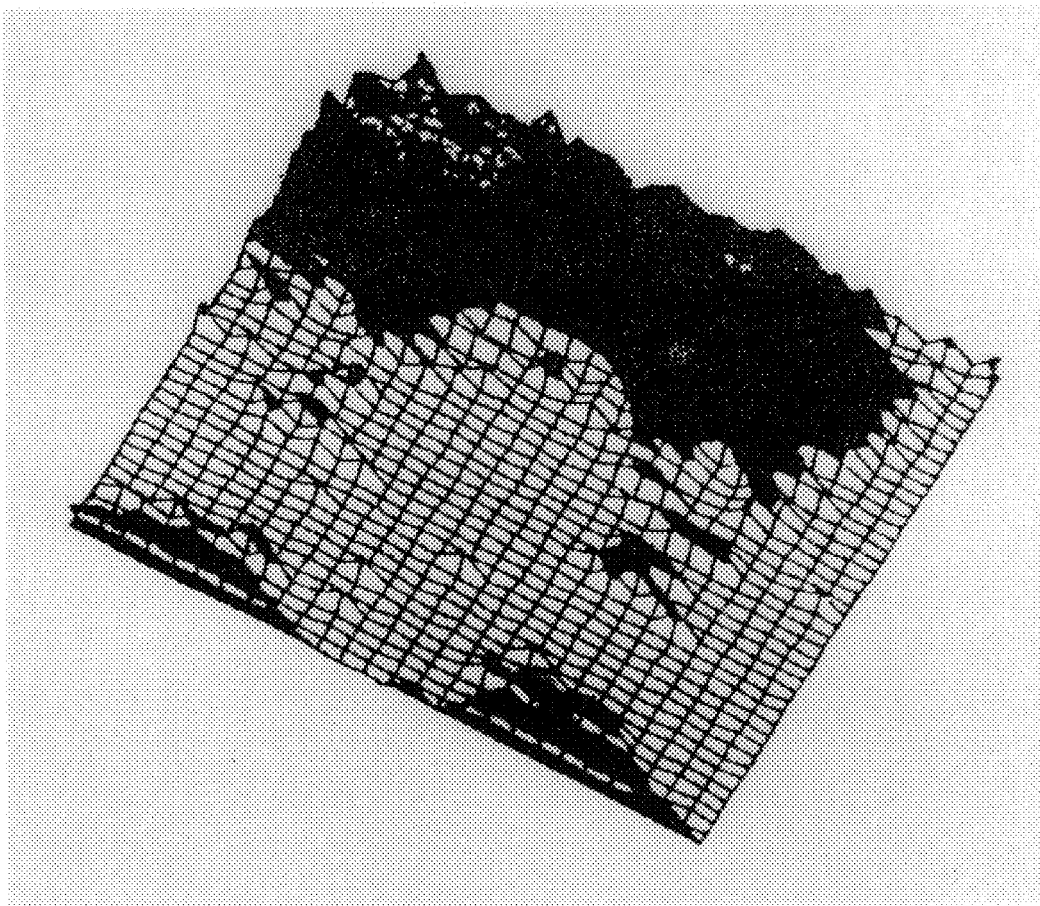
FIG. 26 is an explanatory diagram showing a pressure distribution of a bench part of the seat in a three-dimensional manner.

In the pressure distribution detected through the pressure sensitive sensor 65, two pressure peaks appear beneath the gluteal region of the occupant as shown in FIG. 26. It has been known that those pressure peaks appear beneath ischial tuberosities. In general, it has been also known as to the relationship between the values of the pressure peak and the physical figures that any interrelationship among the height, weight, Rohrer Index and maximum circumferential length of the thigh is not meaningfully recognized (as referred to a magazine of the Japan Medical Society of Paraplegia, VOL. 7, P114, 1994). This is considered to be derived from the fact that the angle between the seated surface and the pelvis, i.e., the configuration of ischial tuberosities, is pointed forward to become narrower, and therefore, that the value of the peak pressure is increased because a seated point of the ischial tuberosities are moved forward as the pelvis is inclined forward. Thus, the physical features (the weight) of the occupant T cannot be obtained from the value of the pressure peak.

In a case where a small child is deeply seated on the seat, legs or shins abut against a toward portion of he bench part 61 in such a manner that knees of the child lifts and that the underside of the thigh does not take a substantial pressure. It follows that the weight of the occupant cannot be accurately obtained from the load acting on the seated surface. Further, also in a case where an adult sits on the seat with knees being bent, the underside of the thigh does not take a substantial pressure.

Therefore, according to the present invention, it is noted that the distance between two pressure peak points existing in the pressure distribution on the bench part 61 is measured by means of the processor 66. The physical figure of the occupant T is determined by measuring the size of the lower portion of the pelvis of the occupant T, wherein the information on the physical figures to be determined includes the height, weight, and indications of obesity degrees such as Rohrer Index and Body Mass Index.

The distance between the pressure peak points can be obtained from the positions of the sensor elements 74 which indicate peak pressures in the measured data. If the sensor elements 74 are scattered in spaced distances, the preciseness of determination on the body height is apt to depend on the distances between the sensor elements 74. Therefore, a lot of sensor elements 74 may be preferably disposed closely. If the sensor elements 74 have to be spaced a relatively great distances, the height of the occupant T may be measured from a distance of seating pressure peak points, which are obtained from a distance between peak points in an approximate curve, the curve being derived from approximation of the data of profile measured between pressure peak points.

Further, the width of the hip relates to the degree of obesity (Rohrer Index and Body Mass Index) and therefore, the obesity degree of the occupant T can be obtained in view of the additional information as to the height obtained from the distance between the pressure peak points as described above. Furthermore, the weight can be obtained from the indication of the height and the obesity degree.

The processor 66, which determines the physical figures of the occupant T as set fourth above, is connected to a control means 64, such as a computer for controlling the operation of the air bag 63, as shown in FIG. 23. The control means 64 is further connected with a shock detecting sensor 67 and an inflator 68 for inflating the air bag 63. If the shock detecting sensor 67 detects a shock or impact, the inflator 68 is operated to inflate or expand the air bag 63.

Information on the physical figures of the occupant T determined by the processor 66 of the sensing device 62 is inputted into the control means 64, which sets the inflation action, and force, speed and direction of the inflation. Upon setting, the figures of the occupant T is divided into, e.g., three classes including big class, middle class and small class, so that the above items are set on the basis of such a classification, respectively. The items thus set are transmitted to the inflator 68 as air bag control signals. The inflator 68 causes inflation action of the air bag 63, based on the control signals.

The air bag apparatus thus arranged in accordance with the present invention is able to inflate the air bag 63 in relation to the physical figure of the occupant T. Therefore, the air bag 63 can be inflated, e.g., with inflation force being weakened, if it is determined that the occupant T is a small female person on the driver's seat, and the air bag can be set so as not to be inflated if it is determined that a small child is seated on the front passenger's seat.

The pressure sensitive sensor 65 may be also disposed within a back rest 69, so that it can be used together with the pressure sensitive sensor 65 disposed in the bench part 61, whereby the physical figure of the occupant T can be more correctly determined.

The present inventors measured the pressure distribution with use of the pressure sensitive sensor 65 which has forty-four by twenty-seven (44×27) sensor elements 74 disposed in a matrix formation in the bench part 61 of the seat. The distance between the sensor elements 74 is set to be 1 cm. The angle of a seat rest is kept constant so that the occupant T can deeply sit on the seat with a sitting position being stable.

Figure 27:
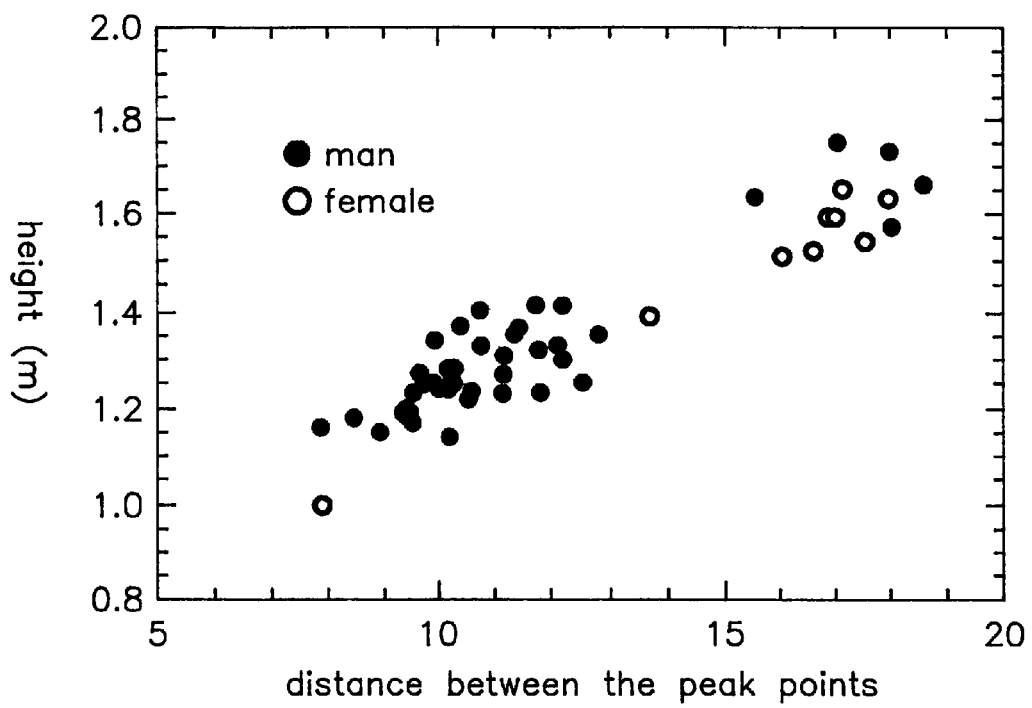
FIG. 27 is a graphic representation showing the relationship between a spaced distance of pressure peaks and a body height.

FIG. 27 is a graph showing the relationship between the height and the distance of the peak points in the pressure distribution of the sensing device 62. It can be understood from FIG. 27 that, as interrelationships exist between the height and the distance of the peak points in the pressure distribution, the height can be obtained from the distance between the peak points in the pressure distribution. The differences between the height determined by means of a regression analysis expression prepared from the presently obtained data and the height actually measured by a height meter fell under a range of ±20 cm. Thus, a classification according to the height is made in such a manner as high, middle and low classes, so that it can be determined, under what class the occupant falls.

Figure 28:
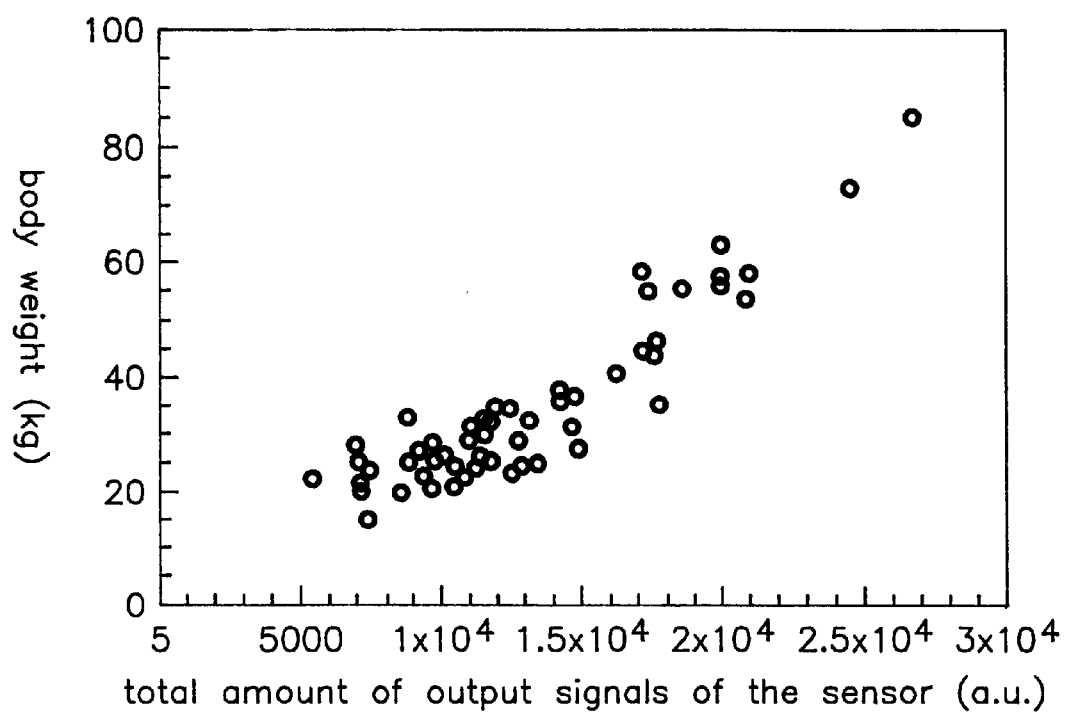
FIG. 28 is a graphic representation showing the relationship between a load imposed on the sensor element (total amount of output signals of a seated surface sensor) and a body weight.

FIG. 28 is a graphic representation showing the relationship between a load imposed on the sensor element (total amount of output signals of the sensor) and a body weight. As seen from FIG. 28, it can be also understood that, as interrelationships exist between the weight of occupant T and the load acting on the sensor elements 74, the weight is obtainable from the load acting on the sensor elements 74. If the angle of the back rest 69 is constant, the load on the bench portion 61 is in proportion with the weight. The gradient of the weight with respect to the total amount of output signals of the sensor changes in an order of approximately 50 kg weight. This is considered to be resulted from the fact that an adult of a weight greater than the order of 50 kg weight has generally the hip width on the seat which is wider than the area having the sensors disposed, and therefore, that the ratio of undetectable load, which the sensors cannot detect, is increased. The functional coefficient are obtained from the data of occupants of adults and children who are not heavier than 50 kg weight, and results indicates R=0.81. This means a substantially direct interrelationship therebetween. The differences between the weight thus determined and the weight measured by a weight meter were no greater than ±7 kg.

The values of the load and the distances between the peak points are indicated in Table-6, wherein the inclination angle of the back rest functioning as a backing support is changed. The distances between the peak points was obtained by calculating an approximate curve.

TABLE 6

| | unit | The back rest is raised fully. | The back rest is inclined for two stages. | The back rest is inclined fully. |
|---|---|---|---|---|
| Value of load | optional unit | 15100 | 13200 | 8800 |
| Value of distances between peakpoints | cm | 15.0 | 14.5 | 14.2 |

As can be understood from Table-6, the load is affected by the inclination angle of the back rest, but the distance between the peak points is not extensively changed with the change of the sitting position. Thus, the body height can be obtained from the distance between the peak points.

Although specific embodiments are described in detail heretofore, various modifications can be made without departing from the spirits and scopes of the present invention.

INDUSTRIAL APPLICABILITY

As described above, the seat with seating sensor according to the present invention is applicable to use for a vehicle, such as an automobile, which is capable of calculating physical conditions, such as a height and weight of an occupant, determining whether the occupant is an adult or a child, determining whether the subject on the seat is a human or an object and individually recognizing an identification of the occupant.

The seating detection device according to the present invention is applicable to use for a vehicle, such as an automobile, which is able to determine whether a subject seated on the seat is a human or an object and which is capable of recognizing the physical figures of the subject when it is a human.

The air bag apparatus according to the present invention is applicable to use for a vehicle, such as an automobile, which is able to control an operation of the air bag in accordance with the physical figures of the occupant.

What is claimed is:

1. A seat comprising:
    a seating sensor provided on a seat back part for detecting a value and position of a pressure transmitted from a back of an occupant leaning against the seat back part; and
    means for calculating a height of the occupant on the basis of the value and position of the pressure detected by said seating sensor.

2. The seat of claim 1, including means for comparing a resultant value obtained by the calculation of said calculating means with a predetermined reference value.

3. The seat of claim 1, wherein said seating sensor includes a sensing element which is variable in electric resistance in response to the pressure.

4. The seat of claim 1, wherein said seating sensor includes a plurality of sensing elements arranged in a formation of two-dimensional matrix.

5. A seat comprising:
    a first seating sensor provided on a seat back part for detecting a value and position of a pressure transmitted from a back of an occupant leaning against the seat back part;
    a second seating sensor provided on a seat cushion part for detecting a value and position of a pressure transmitted from a hip of the occupant seated on the seat cushion part; and means for calculating a height and weight of the occupant on the basis of the value and position of the pressure detected by said first and second seating sensors.

6. The seat of claim 5, including means for comparing a resultant value obtained by the calculation of said calculating means with a predetermined reference value.

7. The seat of claim 5, wherein said first and second seating sensors include a sensing element which is variable in electric resistance in response to the pressure.

8. The seat of claim 5, wherein said first and second seating sensors include a plurality of sensing elements arranged in formation of a two-dimensional matrix.

9. A seat comprising:
   a seat body;
   a pad contained in the seat body; and
   a seating sensor interposed between a surface material of said seat body and said pad, wherein said seating sensor has a plurality of pressure sensitive sections for sensing a value and position of the pressure transmitted from an occupant, and wherein a plurality of protrusions in contact with said pressure sensitive sections are provided on an upper surface of said pad.

10. The seat of claim 9, wherein said seating sensor includes a sensing element which is variable in electric resistance in response to the pressure.

11. The seat of claim 9, wherein said seating sensor includes a plurality of sensing elements arranged in a formation of a two-dimensional matrix.

12. A seating detection device comprising:
   a pressure sensitive sensor which is provided at least on a seat cushion part and which detects a pressing force and a pressed position of a seated subject; and
   subject determination means for determining what the subject is, based on a variation with time on the pressing force and the pressed position detected by said pressure sensitive sensor, said subject determination means being arranged to compare the detected pressure value with a predetermined reference value, thereby determining the the presence of a human on the seat if variation with time on the pressure is detected and determining the presence of an object on the seat if variation with time on the pressure is detected to be substantially constant.

13. The seating detection device of claim 12, wherein said subject determination means is arranged to compare the detected pressure value with a predetermined reference value, thereby determining whether the subject is a human having a weight no less than a predetermined weight, or whether it is a human having a weight less than the predetermined weight.

14. The seating detection device of claim 12, wherein said pressure sensitive sensor includes a sensing element which is variable in electric resistance in response to the pressure.

15. The seating detection device of claim 12, wherein said pressure sensitive sensor includes a plurality of sensing elements arranged in a formation of a two-dimensional matrix.

16. An air bag apparatus comprising:
   a first seating sensor provided on a seat back part for detecting a value and position of a pressure transmitted from a back of an occupant leaning against the seat back part;
   a second seating sensor provided on a seat cushion part for detecting a value and position of a pressure transmitted from a hip of the occupant seated on the seat cushion part;
   means for calculating a height and weight of the occupant on the basis of the value and position of the pressure detected by said first and second seating sensors; and
   control means for controlling the operation of the air bag in accordance with a result calculated by said means for calculating the height and weight.

17. The air bag apparatus of claim 16, wherein said first and second seating sensors include a sensing element which is variable in its electric resistance in response to the pressure variation.

18. The air bag apparatus of claim 16, wherein first and second seating sensors include a plurality of sensing elements arranged in a two-dimensional matrix formation.

19. An air bag apparatus comprising:
   a pressure sensitive sensor which is provided at least on a seat cushion part and which detects a pressing force and a pressed position of a seated subject;
   subject determination means for determining what the subject is, based on a variation with time on the pressing force and the pressed position detected by said pressure sensitive sensor, and subject determination means being arranged to compare the detected pressure value with a predetermined reference value, thereby determining whether the presence of a human on the seat if variation with time on the pressure is detected and determining the presence of an object on the seat if variation with time on the pressure is detected to be substantially constant; and
   control means for controlling the operation of the air bag in accordance with a result of determination of said subject determination means.

20. The air bag apparatus of claim 19, wherein said subject determination means is arranged to compare the detected pressure value with a predetermined reference value, thereby determining whether the subject is a human having a weight no less than a predetermined weight, or whether it is a human having a weight less than the predetermined weight.

21. The air bag apparatus of claim 19, wherein said pressure sensitive sensor includes a sensing element which is variable in its electric resistance in response to the pressure variation.

22. The air bag apparatus of claim 19, wherein said pressure sensitive sensor includes a plurality of sensing elements arranged in a two-dimensional matrix formation.

23. An air bag apparatus comprising:
   a pressure sensitive sensor provided in the bench part of the seat;
   figure determination means for measuring a pressure distribution on the bench part through the pressure-sensitive sensor and determining a physical figure of the occupant on the basis of a distance between two pressure peak points transmitted from a hip of the occupant; and
   control means for controlling the operation of the air bag in accordance with a result of determination of said figure determination means.

24. The air bag apparatus of claim 23, wherein said pressure sensitive sensor includes a sensing element which is variable in electric resistance in response to the pressure.

25. The air bag apparatus of claim 23, wherein said pressure sensitive sensor includes a plurality of sensing elements arranged in a formation of a two-dimensional matrix.

* * * * *